US012028476B2

United States Patent
Zhang

(10) Patent No.: US 12,028,476 B2
(45) Date of Patent: Jul. 2, 2024

(54) CONVERSATION CREATING METHOD AND TERMINAL DEVICE

(71) Applicant: VIVO MOBILE COMMUNICATION CO., LTD., Chang'an Dongguan (CN)

(72) Inventor: Yubing Zhang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 380 days.

(21) Appl. No.: 17/357,130

(22) Filed: Jun. 24, 2021

(65) Prior Publication Data

US 2021/0320995 A1    Oct. 14, 2021

Related U.S. Application Data

(63) Continuation of application No. PCT/CN2019/127140, filed on Dec. 20, 2019.

(30) Foreign Application Priority Data

Dec. 24, 2018   (CN) .......................... 201811584399.7

(51) Int. Cl.
*H04M 1/72*     (2021.01)
*G06F 18/22*    (2023.01)
(Continued)

(52) U.S. Cl.
CPC ........ *H04M 1/72436* (2021.01); *G06F 18/22* (2023.01); *G06V 40/161* (2022.01);
(Continued)

(58) Field of Classification Search
CPC .......... H04M 1/72436; H04M 1/72472; H04N 23/632; G06F 18/22; G06V 40/161
(Continued)

(56) References Cited

U.S. PATENT DOCUMENTS

| 2014/0011487 A1 | 1/2014 | Hwang et al. |
| 2016/0315886 A1 | 10/2016 | Huang |
| 2017/0034325 A1 | 2/2017 | Wang et al. |

FOREIGN PATENT DOCUMENTS

| CN | 104363166 A | 2/2015 |
| CN | 105120084 A | 12/2015 |

(Continued)

OTHER PUBLICATIONS

International Search Report & Written Opinion related to Application No. PCT/CN2019/127140; reported on Mar. 19, 2020.

(Continued)

*Primary Examiner* — Joel Ajayi
(74) *Attorney, Agent, or Firm* — von Briesen & Roper, s.c.

(57) ABSTRACT

This disclosure provides a conversation creating method, including: receiving, by the terminal device, a first input which is performed on a first image that includes at least one face image (201) by a user; displaying, in response to the first input, an icon of at least one communication program (202); receiving, by the terminal device, a second input which is performed by the user (203); and displaying, in response to the second input, a conversation interface that includes M target identifiers (204), where each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M.

19 Claims, 16 Drawing Sheets

(51) Int. Cl.
*G06V 40/16* (2022.01)
*H04M 1/72436* (2021.01)
*H04M 1/72472* (2021.01)
*H04N 23/63* (2023.01)
*G06F 3/04817* (2022.01)
*G06F 3/04883* (2022.01)

(52) U.S. Cl.
CPC ...... *H04M 1/72472* (2021.01); *H04N 23/632* (2023.01); *G06F 3/04817* (2013.01); *G06F 3/04883* (2013.01)

(58) Field of Classification Search
USPC .............................................. 455/466
See application file for complete search history.

(56) References Cited

FOREIGN PATENT DOCUMENTS

| | | |
|---|---|---|
| CN | 106302137 A | 1/2017 |
| CN | 106559558 A | 4/2017 |
| CN | 106791182 A | 5/2017 |
| CN | 109766156 A | 5/2019 |

OTHER PUBLICATIONS

First Chinese Office Action for related Application No. 201811584399.7; reported on Feb. 27, 2020.
Extended European Search Report for related Application No. 19905951.0; reported on Jan. 21, 2022.

CONVERSATION CREATING METHOD AND TERMINAL DEVICE

CROSS-REFERENCE TO RELATED APPLICATIONS

This application is a continuation application of a PCT Application No. PCT/CN2019/127140 filed on Dec. 20, 2019, which claims priority to Chinese Patent Application No. 201811584399.7, filed in China on Dec. 24, 2018, which is incorporated herein by reference in its entirety.

TECHNICAL FIELD

Embodiments of this disclosure relate to the field of communications technologies, and in particular, to a conversation creating method and a terminal device.

BACKGROUND

With development of communications technologies, there are increasing ways for users to send information using terminal devices.

Generally, if a user needs to send the same message to multiple contacts through a communication program on a terminal device, the user can find the multiple contacts in a contact list of the communication program, and trigger the terminal device to create a group chat for these contacts, and then the user can trigger the terminal device to send a message to these contacts through the group chat, that is, these contacts can all receive the message that is sent under the user's trigger.

However, if the user is unable to know the name of a contact, using the foregoing contact finding method may not quickly find the desired contact, thus the group chat is created slowly.

SUMMARY

Embodiments of this disclosure provide a conversation creating method and a terminal device to resolve the problem that a group chat is created slowly when a user is unable to know the name of a contact.

To resolve the foregoing technical problem, the embodiments of this disclosure are implemented as follows:

According to a first aspect, an embodiment of this disclosure provides a conversation creating method. The method includes: receiving a first input which is performed on a first image that includes at least one face image by a user; displaying, in response to the first input, an icon of at least one communication program; receiving a second input which is performed by the user; and displaying, in response to the second input, a conversation interface that includes M target identifiers, where each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M.

According to a second aspect, an embodiment of this disclosure further provides a terminal device. The terminal device includes a receiving module and a display module, where the receiving module is configured to receive a first input which is performed on a first image that includes at least one face image by a user; the display module is configured to display, in response to the first input received by the receiving module, an icon of at least one communication program; the receiving module is further configured to receive a second input which is performed by the user; and the display module is further configured to display, in response to the second input received by the receiving module, a conversation interface that includes M target identifiers, where each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M.

According to a third aspect, an embodiment of this disclosure provides a terminal device, including a processor, a memory, and a computer program stored in the memory and running on the processor, where when the computer program is executed by the processor, the steps of the conversation creating method according to the first aspect are implemented.

According to a fourth aspect, an embodiment of this disclosure provides a computer readable storage medium for storing a computer program. When the computer program is executed by a processor, the steps of the conversation creating method according to the first aspect are implemented.

In the embodiments of this disclosure, firstly, the terminal device receives a first input which is performed on a first image that includes at least one face image by a user. Secondly, the terminal device displays, in response to the first input, an icon of at least one communication program. Then, the terminal device receives a second input by the user. Finally, the terminal device displays, in response to the second input, a conversation interface that includes M target identifiers. Each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M. The first image includes a face image, and the terminal device can display the icon of the at least one communication program to the user based on the received first input which is performed on the first image by the user, thereby allowing the user to select a communication program and to select face images corresponding to desired users. After the user finishes selection, the terminal device displays a conversation interface for users indicated by K face images in the at least one face image. Therefore, the conversation creating method provided in the embodiments of this disclosure can quickly find a desired contact based on an image that includes a face image, and then can quickly create a conversation or add the user to an existing group chat.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

It should be noted that "I" in this specification represents or, for example, A/B may represent A or B; and that the term "and/or" in this specification describes only an association relationship for describing associated objects and represents that three relationships may exist, for example, A and/or B may represent the following three cases: only A, both A and B, and only B. "Plurality" means two or more.

In the specification of the embodiments and the claims of this disclosure, the terms "first", "second", and so on are intended to distinguish between different objects but do not indicate a particular order of the objects. For example, a first add control and a second add control are used to distinguish different add controls, rather than to describe the specific order of the add controls.

It should be noted that, in the embodiments of this disclosure, terms such as "exemplary" or "for example" are used to represent an example, an instance, or an illustration. Any embodiment or design scheme described as "exemplary" or "for example" in the embodiments of this disclosure shall not be interpreted as being more preferred or advantageous than other embodiments or design schemes.

Specifically, the terms such as "an example" or "for example" are used to present related concepts in a specific manner.

A terminal device in the embodiments of this disclosure may be a terminal with an operating system. The operating system may be an Android operating system, may be an iOS operating system, or may be other possible operating systems, which is not specifically limited in the embodiments of this disclosure.

The following uses the Android operating system as an example to introduce a software environment to which a conversation creating method provided in the embodiments of this disclosure is applied.

Figure 1:
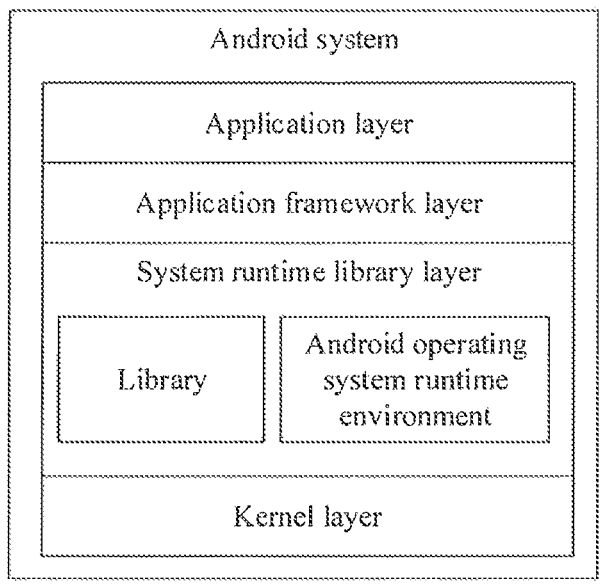
FIG. 1 is a possible schematic architectural diagram of an Android operating system according to an embodiment of this disclosure.

FIG. 1 is a possible schematic architectural diagram of an Android operating system according to an embodiment of this disclosure. In FIG. 1, an architecture of the Android operating system includes four layers: an application layer, an application framework layer, a system runtime library layer, and a kernel layer (which may be specifically a Linux kernel layer).

The application layer includes various application programs (including system application programs and third-party application programs) on the Android operating system.

The application framework layer is a framework of application programs, and developers may develop some application programs based on the application framework layer in compliance with development principles of the framework of application programs.

The system runtime library layer includes a library (also called a system library) and a runtime environment of the Android operating system. The library mainly provides various resources required by the Android operating system. The runtime environment of the Android operating system is used to provide a software environment for the Android operating system.

The kernel layer is an operating system layer of the Android operating system, and is a bottom layer in software layers of the Android operating system. The kernel layer provides core system services and hardware-related drivers for the Android operating system based on the Linux kernel.

Using the Android operating system as an example, in the embodiments of this disclosure, developers may develop, based on the system architecture of the Android operating system shown in FIG. 1, a software program for implementing the conversation creating method provided in the embodiments of this disclosure, so that the conversation creating method can be executed based on the Android operating system shown in FIG. 1. In other words, a processor or a terminal device may implement the conversation creating method provided in the embodiments of this disclosure by running the software program on the Android operating system.

Figure 2:
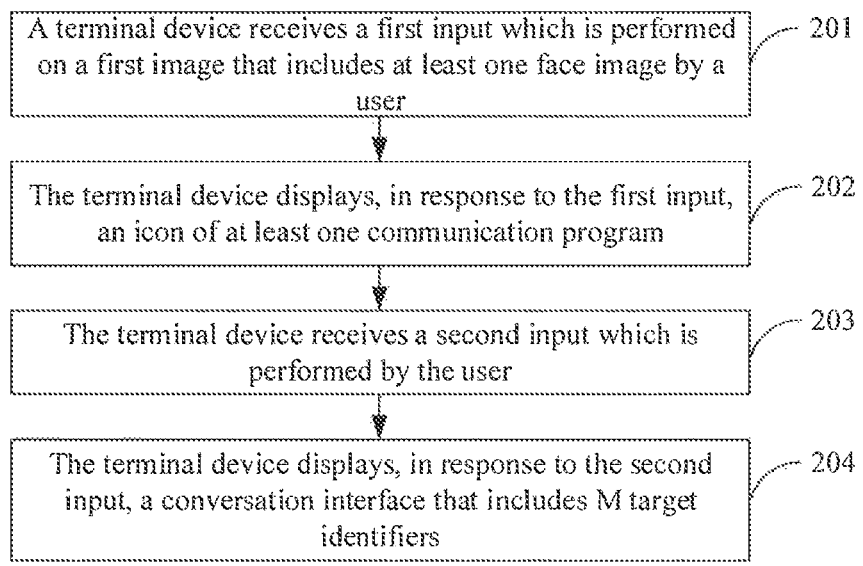
FIG. 2 is a schematic flowchart of a conversation creating method according to an embodiment of this disclosure.

The following describes the conversation creating method in the embodiments of this disclosure with reference to FIG. 2. FIG. 2 is a schematic flowchart of a conversation creating method according to an embodiment of this disclosure. As shown in FIG. 2, the conversation creating method includes step 201 to step 204:

Step 201. A terminal device receives a first input which is performed on a first image that includes at least one face image by a user.

For ease of description, the first image being displayed in a first interface is used as an example. The first interface may be an interface with which the terminal device captures images (that is, a shooting preview interface), or may be an interface on which the terminal device displays images (for example, an interface for the user to view an image selected from an album or an image receiving application), which is not specifically limited in the embodiments of this disclosure.

Figure 3:
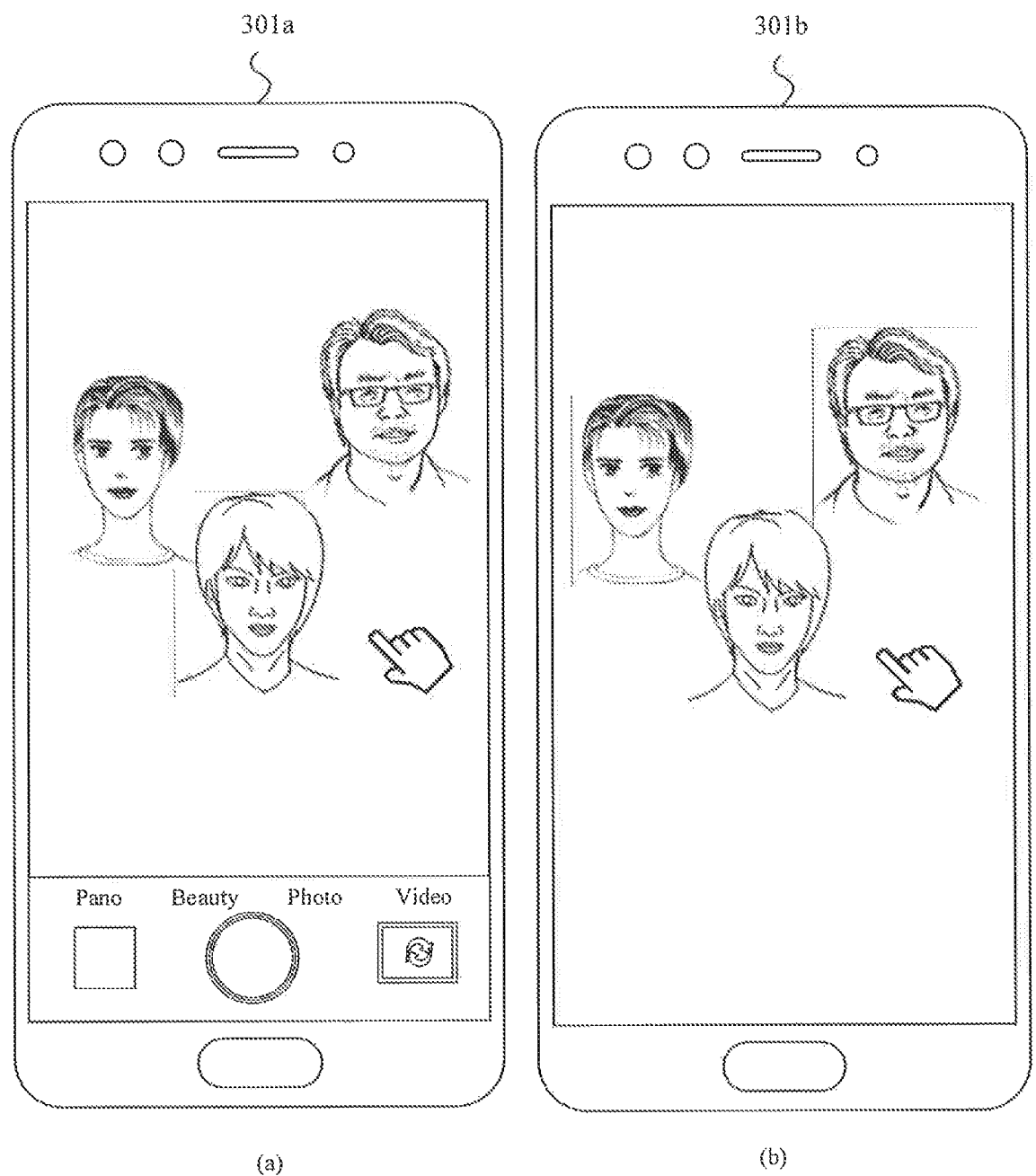
FIG. 3 is a first schematic diagram of a display interface according to an embodiment of this disclosure.

For example, FIG. 3 is a schematic diagram of a display interface according to an embodiment of this disclosure. The first interface may be an interface 301a shown in FIG. 3(a) or an interface 301b shown in FIG. 3(b). The interface 301a is a shooting preview interface of a camera of the terminal device, and the interface 301b is a display interface of the terminal device for displaying images.

It should be noted that the first interface may further display a "face search" or "people finder" control, which may be displayed in a region adjacent to another control on a shooting interface (for example, it may be displayed in a region on the right of "Video" in the interface 301a), or may be displayed in a region adjacent to another control after the user selects the first image. Therefore, the first input may be the input with respect to the "face search" or "people finder" control. Certainly, the "face search" and "people finder" controls may not be displayed in the first interface, and a face search function can be enabled by receiving a shortcut input (for example, long press) by the user. This is not specifically limited in the embodiments of this disclosure.

Optionally, the first input may be a touch interface input, a fingerprint input, a gravity input, a key input, or the like. The touchscreen input is an input such as a press input, a long-press input, a swipe input, a tap input, or a hover input (an input which is performed by the user in the proximity of the touchscreen) which is performed on the touchscreen of the terminal device by the user. The fingerprint input is inputs such as swipe fingerprint, long-press fingerprint, single-tap fingerprint, and double-tap fingerprint which are performed on a fingerprint recognizer of the terminal device by the user. The gravity input is an input such as shaking the terminal device in a specific direction and shaking the terminal device a specific number of times which is performed by the user. The key input corresponds to an input such as a single-tap input, a double-tap input, a long press input, and a combination key input which is performed on keys such as a power key, a volume key, and a home key of the terminal device by the user. Specifically, the first input is not limited to any specific manner in the embodiments of this disclosure, and any manner can be used provided that the manner is implementable.

It should be noted that, in an embodiment of this disclosure, the first input may be a continuous input, or may be multiple discontinuous sub-inputs, which is not specifically limited in the embodiments of this disclosure.

Step 202. The terminal device displays, in response to the first input, an icon of at least one communication program.

For ease of description, it is assumed that an interface on which the terminal device displays the icon of the at least one communication program is a second interface.

Specifically, the terminal device updates the first interface to display the second interface that includes the icon of the at least one communication program.

It can be understood that the at least one communication program in the embodiments of this disclosure is a communication program with contacts that is installed on the terminal device.

Step 203. The terminal device receives a second input which is performed by the user.

Optionally, the second input may be a continuous input, or may be an input composed of multiple discontinuous sub-inputs, which is not specifically limited in the embodiments of this disclosure.

It can be understood that the second input may be an input of selecting a face image in the first image and selecting an icon of a communication program which is performed by the user.

Step 204. The terminal device displays, in response to the second input, a conversation interface that includes M target identifiers.

Each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M.

It should be noted that different users may use a same image as a profile photo, and therefore K face images may correspond to more than K users.

Optionally, the target identifier may be an alias, a nickname, a user name, or the like.

Optionally, in an embodiment of this disclosure, the conversation interface may be a group chat interface or a group message interface, which is not specifically limited in the embodiments of this disclosure.

Specifically, the terminal device updates the foregoing second interface to display the conversation interface that includes M target identifiers.

Generally, when the conversation interface is a group chat interface, the user can send a message to these contacts on the group chat interface, these contacts can all receive the message sent by the user, any one of these contacts can also send a message in the group chat, and other users can all receive messages sent by these contacts in the group chat. When the conversation interface is a group message interface, the user can send a message to these contacts in the group message interface, and these contacts can all receive the message sent by the user.

In the conversation creating method provided by the embodiments of this disclosure, firstly, the terminal device receives a first input which is performed on a first image that includes at least one face image by a user. Secondly, the terminal device displays, in response to the first input, an icon of at least one communication program. Then, the terminal device receives a second input which is performed by the user. Finally, the terminal device displays, in response to the second input, a conversation interface that includes M target identifiers. Each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M. The first image includes a face image, and the terminal device can display the icon of the at least one communication program to the user based on the received first input which is performed on the first image by the user, thereby allowing the user to select a communication program and to select face images corresponding to desired users. After the user finishes selection, the terminal device displays a conversation interface for users indicated by K face images in the at least one face image. Therefore, the conversation creating method provided in the embodiments of this disclosure can quickly find a desired contact based on an image that includes a face image, and then can quickly create a conversation or add the user to an existing group chat.

In a possible implementation, step 202 of the conversation creating method provided in the embodiments of this disclosure may be specifically executed as step 202a1.

Step 202a1. Display, in response to the first input, the at least one face image in the first image and the icon of the at least one communication program.

For ease of description, it is assumed that the second interface may also display the at least one face image. Specifically, the terminal device updates the first interface to display the second interface that includes the at least one face image in the first image and the icon of the at least one communication program.

Figure 4:
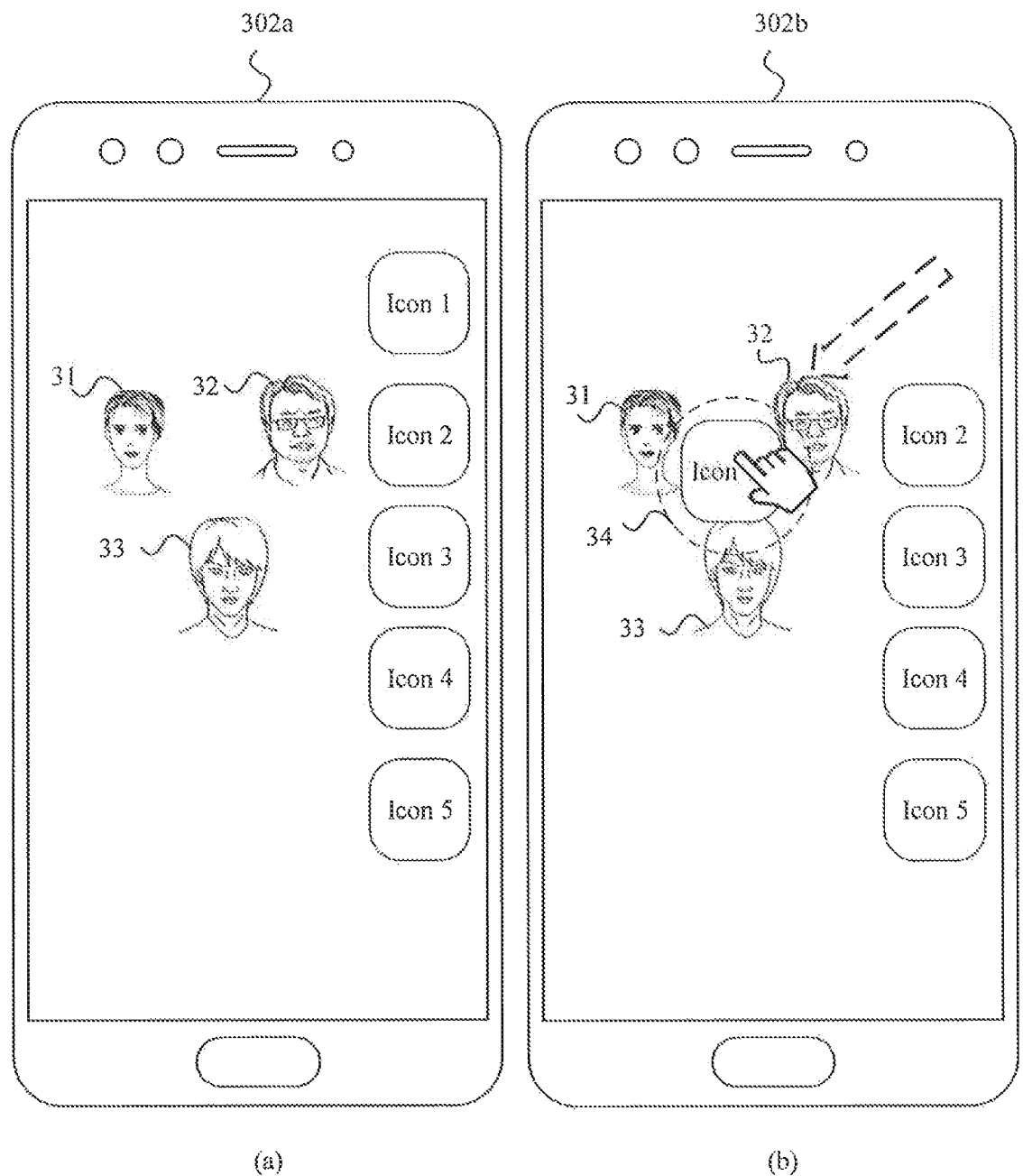
FIG. 4 is a second schematic diagram of a display interface according to an embodiment of this disclosure.

For example, referring to FIG. 4, as shown in FIG. 4(a), the second interface may be an interface 302a, and the interface 302a includes 3 face images and icons of 5 communication programs, which are respectively: face image 31, face image 32, face image 33, icon 1 of communication program 1, icon 2 of communication program 2, icon 3 of communication program 3, icon 4 of communication program 4, and icon 5 of communication program 5.

Furthermore, the second input may be an input that the user selects only an icon of the communication program on the second interface. In this case, the second input may mean by default that the user has selected all the face images in the second interface and the icon of the communication program corresponding to the face images; or the second input may include a sub-input which is performed on face images and a sub-input which is performed on icons by the user, which is not specifically limited in the embodiments of this disclosure.

Optionally, the second interface may further include a select control. The select control can be used for the user to select which contacts are desired.

Figure 5:
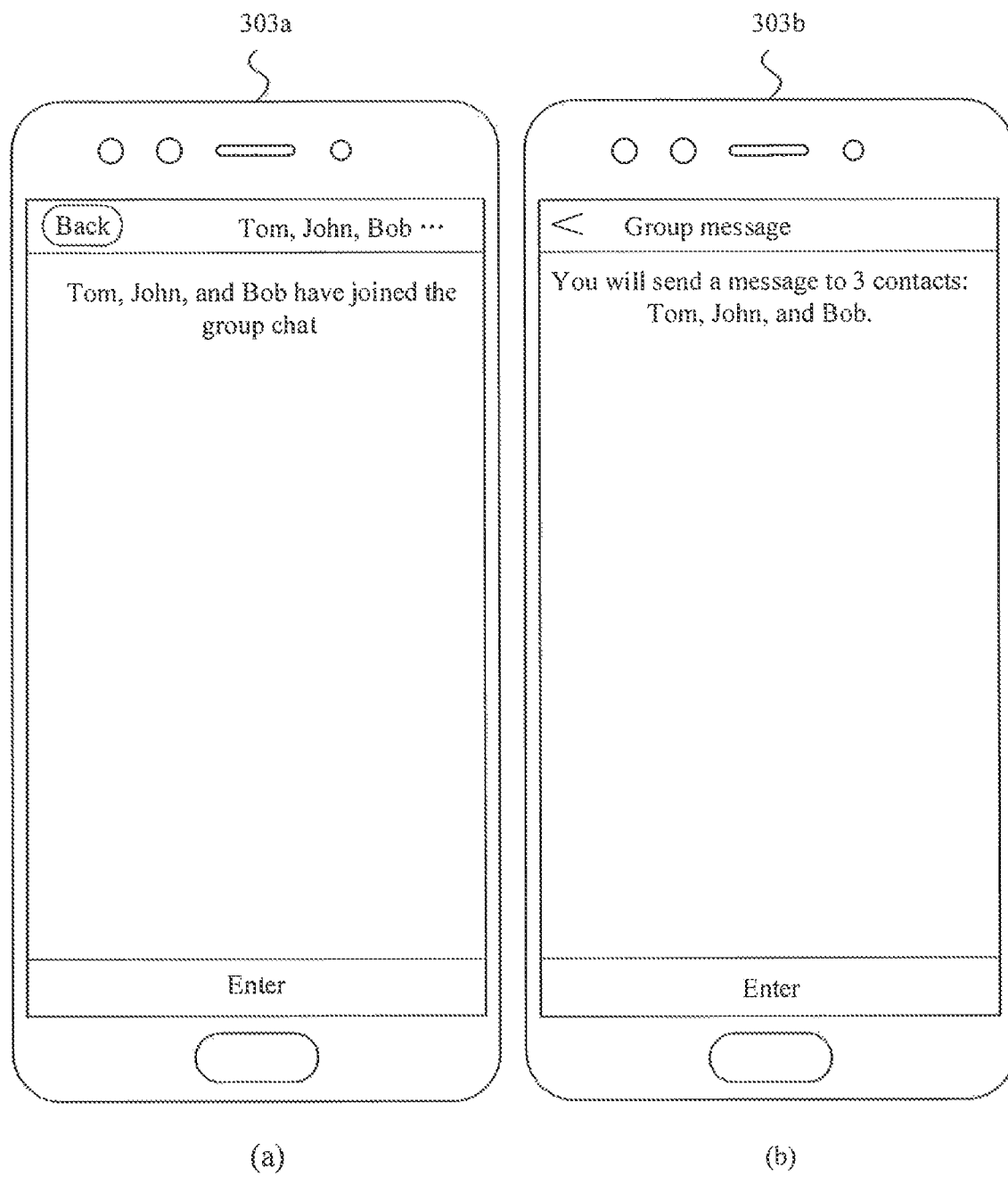
FIG. 5 is a third schematic diagram of a display interface according to an embodiment of this disclosure.

For example, as shown in FIG. 4(b), the second interface may alternatively be an interface 302b, and the interface 302b further includes a select control 34. In a case that the terminal device updates the first interface to display the second interface, the select control 34 in the interface 302b may circle all the face images in an area surrounded by a dotted line to represent that all the face images have been selected. Certainly, the user may move any face image in the second interface, for example, the user may remove any face image from the region enclosed by the dotted line (including deletion and moving to other regions in the second interface). Assuming that the second input is an input that the user selects the face image 31, the face image 32, and the face image 33 in the interface 302a, and moves the icon 1 to a region in which the three face images are located (for example, within a dotted circle 34). After all the three face images are moved into the dotted circle, a conversation interface displayed by the terminal device may be an interface 303a shown in FIG. 5(a), or an interface 303b shown in FIG. 5(b). The interface 303a may be a group chat interface that may include three user names corresponding to three face images. The interface 303b may be a group message interface that may also include three user names corresponding to three face images.

Based on this solution, the terminal device can display the at least one face image and the icon of the foregoing at least one communication program according to the first input which is performed by the user, thereby allowing the user to select, based on the displayed at least one face image, face images corresponding to desired users with whom the user intends to create a conversation. Therefore, with the conversation creating method provided by the embodiments of this disclosure, the user can more conveniently select and quickly find a desired contact based on at least one face image displayed by the terminal device.

In a possible implementation, the conversation creating method provided by the embodiments of this disclosure may further include step 205 and step 206 after step 203.

Step 205. The terminal device displays, in response to the second input, N face images and N target identifiers.

Each of the face images corresponds to one target identifier, N users indicated by the N target identifiers include users indicated by P face images in the at least one face image, and the N target identifiers are identifiers in a target communication program, where P is an integer less than or equal to N.

For ease of understanding, an interface on which the terminal device displays N face images and N target identifiers is a third interface. Specifically, the terminal device may update the foregoing second interface to display the third interface that includes N face images and N target identifiers.

For example, the third interface may be an interface for creating a group chat. After receiving the second input which is performed by the user, the terminal device may display an interface 304a shown in FIG. 6(a).

Step 206. The terminal device receives a third input which is performed by the user.

It should be noted that the third input is an input that the user confirms creation of a conversation, or an input of adding the selected user to the group chat. The third input may be a continuous input or multiple discontinuous sub-inputs, which is not specifically limited in the embodiments of this disclosure.

Specifically, the third input may be an input which is performed on the third interface by the user.

Figure 7:
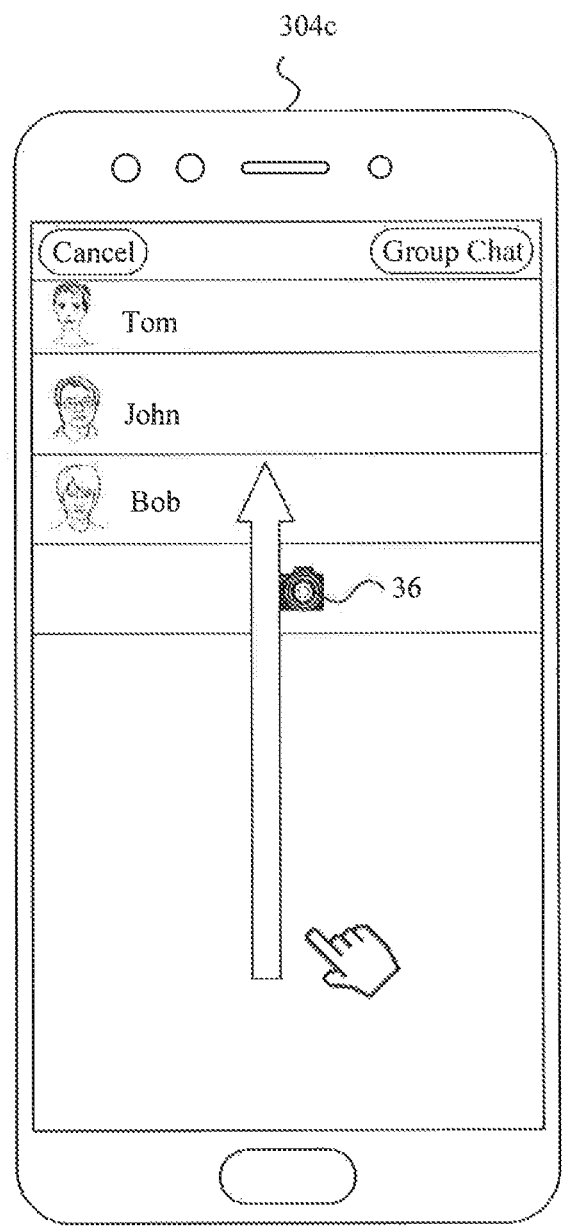
FIG. 7 is a fifth schematic diagram of a display interface according to an embodiment of this disclosure.

For example, the third input may be an input which is performed on a creation confirming control by the user in the interface. For example, the third input may be an input that the user taps "Group Chat" in an interface 304c shown in FIG. 7; and the third input may alternatively be a shortcut input, for example, the third input may alternatively be an input that the user swipes up from the bottom of the screen, as shown in interface 304c.

Furthermore, step 204 may be performed as step 204a.

Step 204a. The terminal device displays, in response to the third input, a conversation interface.

Specifically, the terminal device may update, in response to the third input, the foregoing second interface to display the conversation interface.

Based on this solution, after the terminal device displays a target identifier, the user can determine, based on the displayed target identifier and the face image, whether the contact corresponding to the face image is a contact desired by the user.

Optionally, the third input is a swipe input which is performed in a preset direction in a blank region without the N face images and the N target identifiers displayed by the user.

It can be understood that the third input is an input that the user confirms creation of a conversation or confirms joining a created conversation.

For example, the third input may be an input that the user swipes from a blank region toward the top of the screen.

Based on this solution, the user can use a swipe input in a preset direction in the blank region to control the terminal device to display the conversation interface, making the third input faster.

In a possible implementation, the conversation creating method provided by the embodiments of this disclosure may further include step 207 to step 209 after step 203.

Step 207. The terminal device displays a preset control.

Optionally, the third interface further includes the preset control.

Optionally, the preset control may be a textual control with an add function, or an iconic control with an add function. The embodiments of this disclosure do not specifically limit the type and display position of the preset control.

Figure 6:
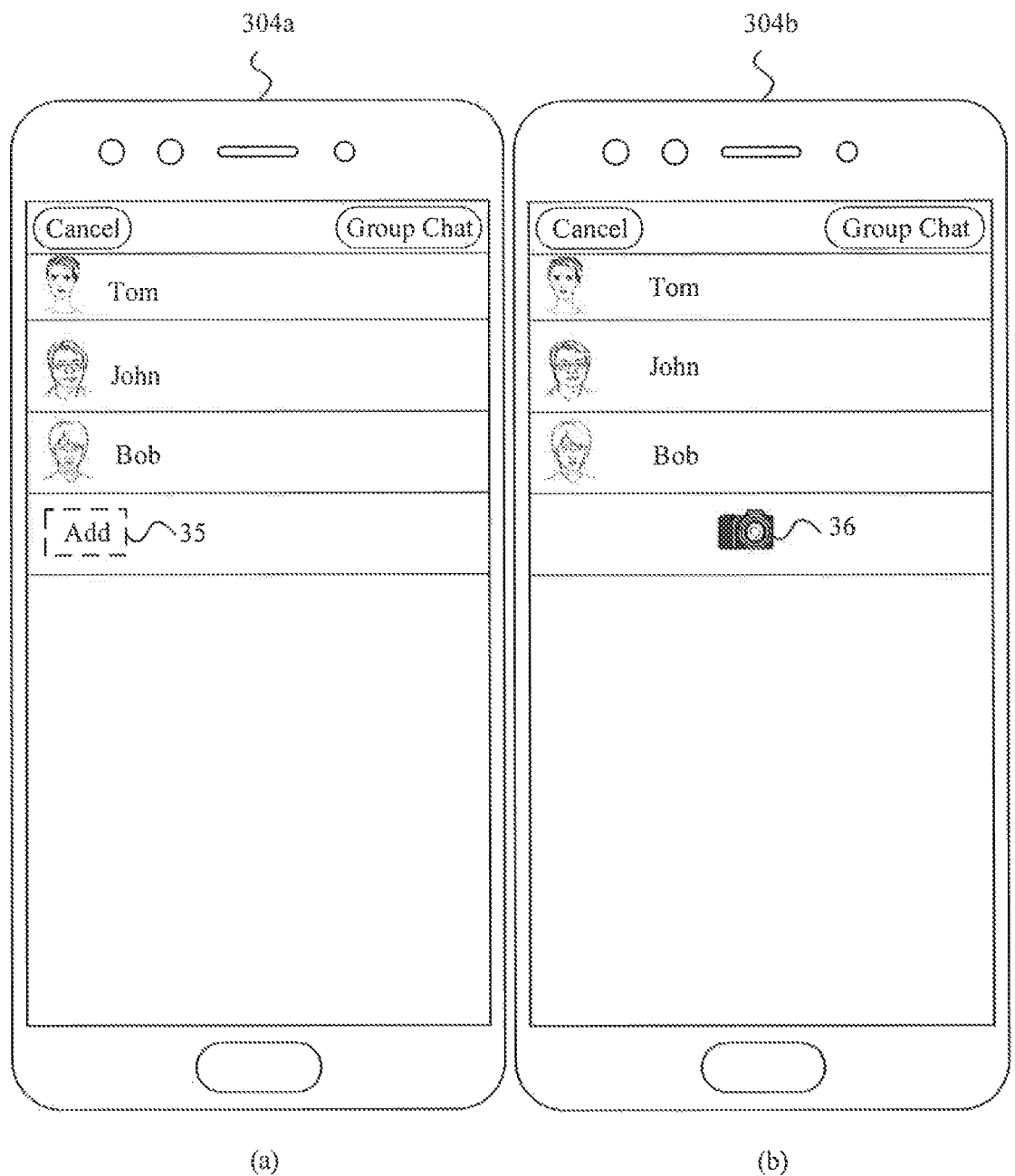
FIG. 6 is fourth a schematic diagram of a display interface according to an embodiment of this disclosure.

For example, a preset control in an interface 304a shown in FIG. 6(a) is an "add" control 35, which is a textual add control, and a preset control in an interface 304b shown in FIG. 6(b) is a camera icon 36, which is an iconic add control.

Step 208. The terminal device receives a fourth input which is performed on the preset control by the user.

It can be understood that, in the embodiments of this disclosure, the user can also use the preset control to add a contact in a contact list of the communication program, that is, a conversation created by the conversation creating method in the embodiments of this disclosure may further include a contact manually selected by the user directly from the contact list.

Figure 8:
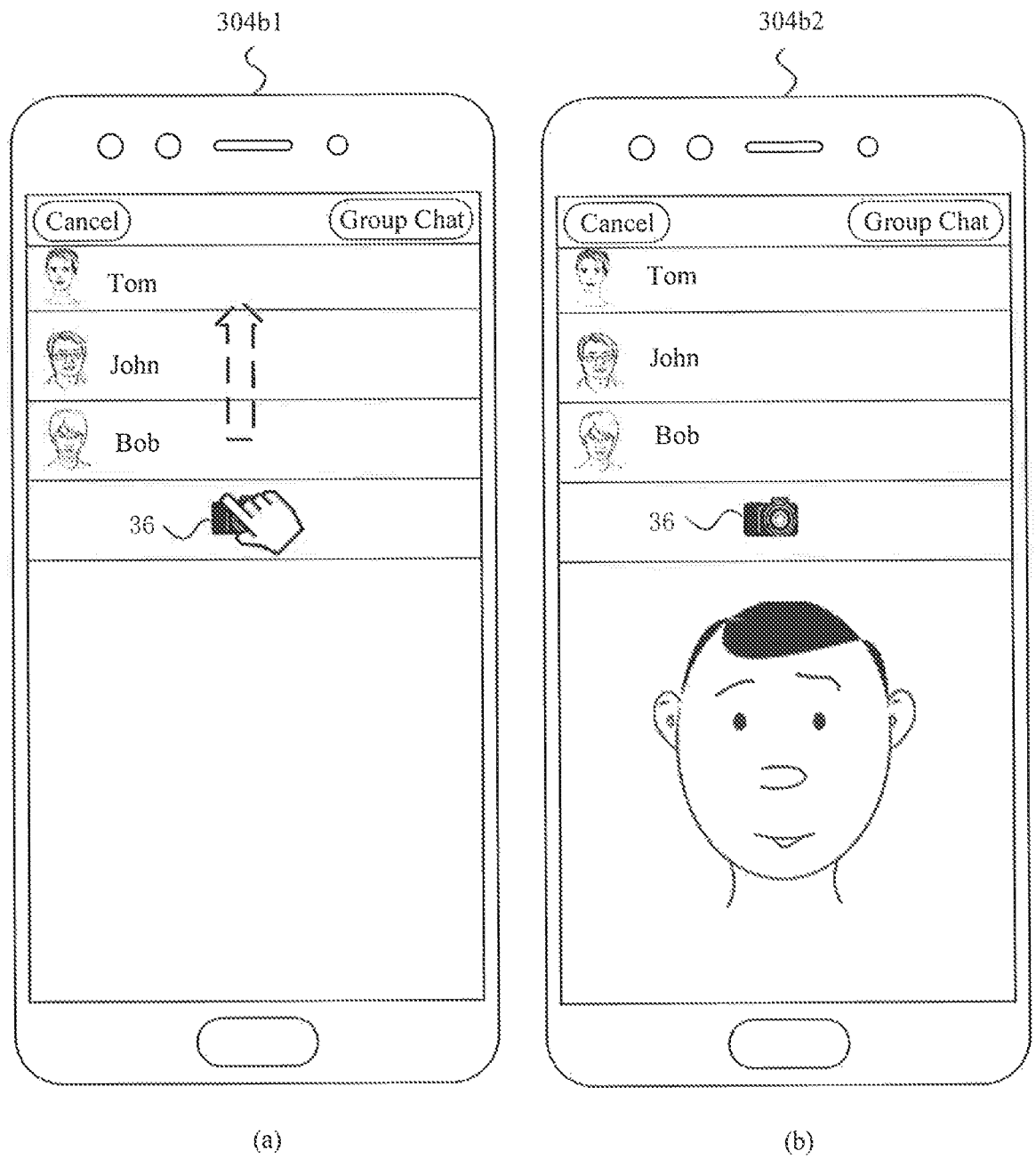
FIG. 8 is a sixth schematic diagram of a display interface according to an embodiment of this disclosure.

For example, the fourth input may be an input that the user selects a camera icon 36 (that is, the preset control), or an input that the user selects the camera icon 36 and swipes up, for example, the input in the interface 304b1 shown in FIG. 8(a).

Optionally, the fourth input may be a continuous input, or may be an input composed of multiple sub-inputs, which is not specifically limited in the embodiments of this disclosure.

Step 209. The terminal device displays, in response to the fourth input, T face images and T target identifiers.

Specifically, the terminal device updates, in response to the fourth input, the third interface, and the updated third interface includes T face images and T target identifiers.

The T face images include the N face images, the T target identifiers include the N target identifiers, other face images in the T face images than the N face images are face images in a second image, the second image is an image corresponding to the fourth input, and users indicated by other target identifiers in the T target identifiers than the N target identifiers are users indicated by the other face images, where T is a positive integer.

Based on this solution, the terminal device displays the preset control in the third interface, which can facilitate the user to determine, based on the N target identifiers and N face images displayed in the first image, whether to continue to add other contacts.

Optionally, the fourth input includes a first sub-input and a second sub-input.

In a possible implementation, step 209 of the conversation creating method provided in the embodiments of this disclosure may be executed as step 209a and step 209b.

Step 209a. In a case that the N face images and the N target identifiers are displayed in a first region, the terminal device displays, in response to the first sub-input which is performed on the preset control by the user, a shooting preview interface in a second region.

Step 209b. In response to the second sub-input which is performed on the preset control by the user, perform a shooting operation, display in the second region the second image that is shot, and display in the first region a first face image in the second image, a first target identifier, the N face images, and the N target identifiers.

It can be understood that the second image may include at least one face image.

Figure 9:
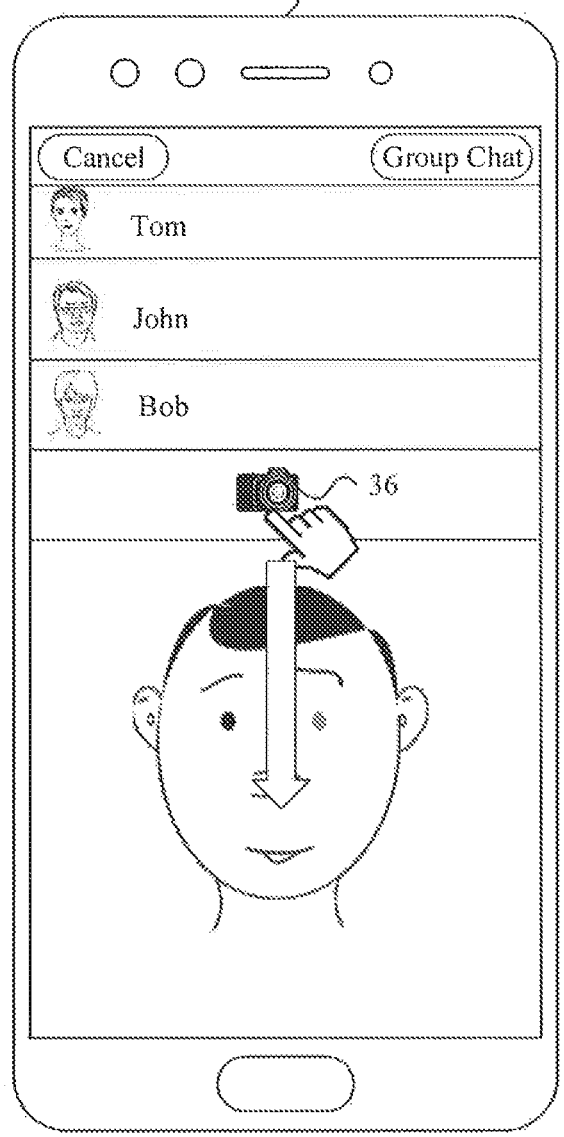
FIG. 9 is a seventh schematic diagram of a display interface according to an embodiment of this disclosure.
Figure 9:
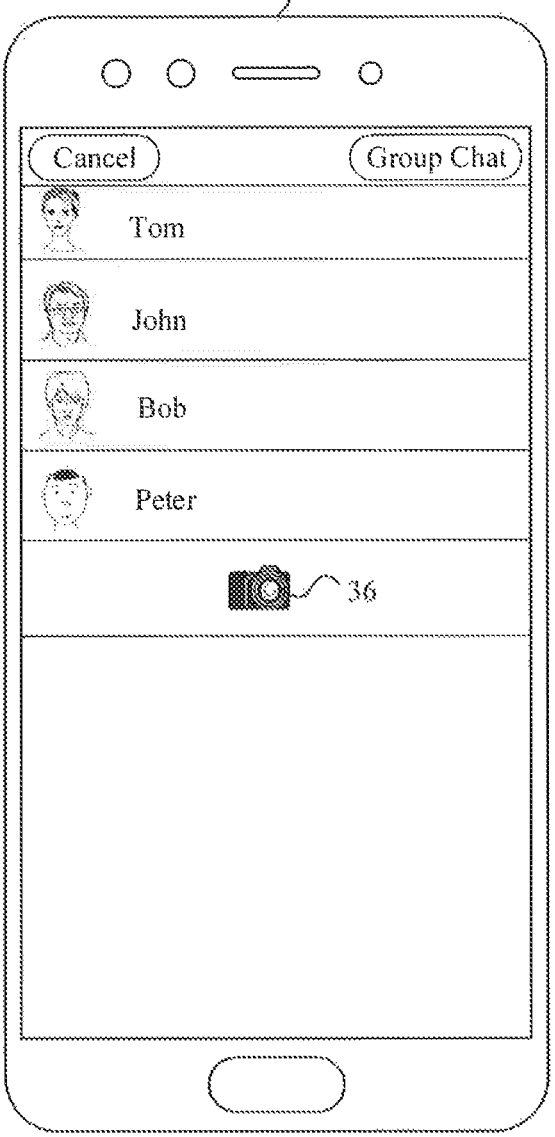

For example, when the fourth input is an input composed of multiple sub-inputs, as shown in FIG. 8(a), the user first selects the camera icon 36 in an interface 304b1 and drags it upward, and then the terminal device displays an interface 304b2 shown in FIG. 8(b), where the interface 304b2 includes an image capture region (for example, a shooting preview interface). The user may select the camera icon 36 again in the interface 304b2 and swipe down, as in an interface 304b3 shown in FIG. 9(a). The terminal device may then display face images in images acquired in the image capture region and target identifiers corresponding to these face images in an interface 304b4 shown in FIG. 9(b).

It should be noted that in the embodiments of this disclosure, the interface 304b2 is described using only the image capture region (including a camera preview interface) as an example. However, the interface 304b2 may also display the contact list of the communication program, and the user may also select a contact to add from the contact list, which is not specifically limited in the embodiments of this disclosure.

It can be understood that, in the embodiments of this disclosure, only an image that includes one face image captured in the image capture region is used as an example. For an actual communication program, if the image captured in the image capture region includes multiple face images, target identifiers corresponding to the multiple face images can be displayed in the first region of the interface 304b4 shown in FIG. 9(b).

Based on this solution, the terminal device can display a shooting preview interface in the second region based on the first sub-input which is performed on the preset control by the user, and then the terminal device receives the second sub-input which is performed on the preset control by the user, performs a shooting operation, displays in the second region the second image that is shot, and displays in the first region a first face image in the second image, a first target identifier, and the N face images and the N target identifiers that are previously displayed, allowing the user to continue adding users based on an image including face images.

In a possible implementation, the conversation creating method provided by the embodiments of this disclosure may further include step 210 and step 211 after step 205.

Step 210. The terminal device receives a fifth input which is performed by the user.

Specifically, the terminal device may receive the fifth input which is performed on the third interface by the user.

Optionally, the fifth input may be a continuous input, or may be multiple discontinuous sub-inputs, which is not specifically limited in the embodiments of this disclosure.

It can be understood that the fifth input is an input of removing unwanted contacts by the user.

Optionally, the third interface may further include a delete control, and the fifth input may specifically be an input which is performed on the second face image and the delete control by the user.

Step 211. The terminal device displays, in response to the fifth input, J face images and J target identifiers.

The J face images are images in the N face images, and the J target identifiers are identifiers in the N target identifiers, where J is a positive integer less than N.

The terminal device updates, in response to the fifth input, the third interface, and the updated third interface includes the J face images and the J target identifiers.

Figure 10:
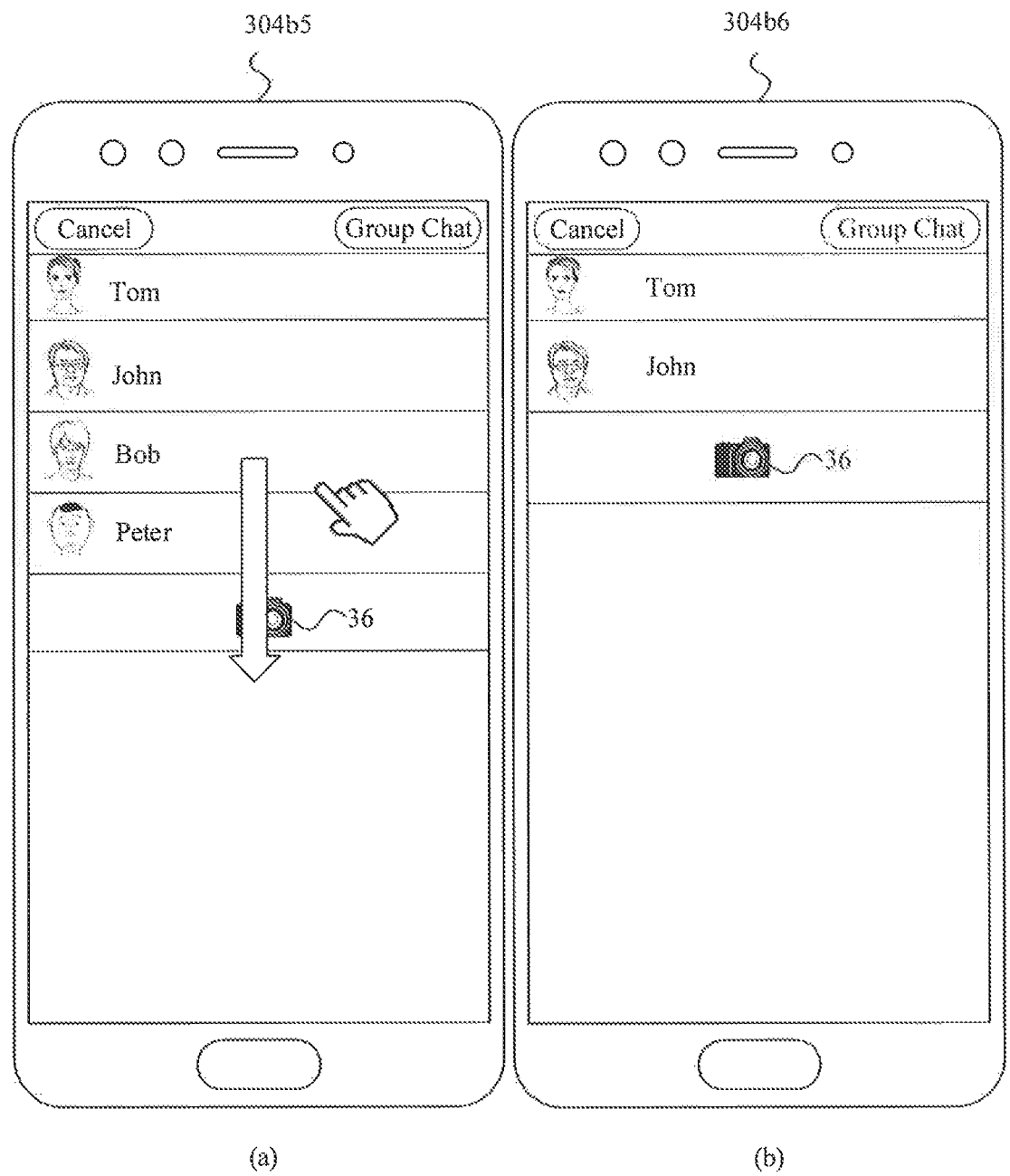
FIG. 10 is an eighth schematic diagram of a display interface according to an embodiment of this disclosure.

For example, assuming that an interface 304b5 shown in FIG. 10(a) is the third interface, the user may start to swipe down from Bob in the interface 304b5, and the third interface can be updated by the terminal device to an interface 304b6 (that is, the updated third interface) shown in FIG. 10(b), where the interface 304b6 includes Tom and John, and face images corresponding to them two.

Based on this solution, the user can delete the unwanted contacts from the third interface.

In a possible implementation, the conversation creating method provided by the embodiments of this disclosure may further include step 210a and step 211a after step 205.

Step 210a. Receive a fifth input which is performed on a second face image by the user.

The second face image is a face image in the N face images.

Step 211a. Delete the second face image and at least one target identifier corresponding to the second face image in response to the fifth input.

For example, assuming that one face image of the user corresponds to one or more target identifiers, when receiving a swipe input which is performed on the second face image by the user, the terminal device can delete both the second face image and target identifiers corresponding to the terminal device, or delete the second face image and part of the target identifiers corresponding to the second face image.

It should be noted that the N face images may include a same face image, which is not specifically limited in the embodiments of this disclosure.

Based on this solution, according to an input which is performed on a second face image in the N face images displayed on the terminal device by the user, the terminal device can delete the second face image and at least one target identifier corresponding to the second face image making delete operations more convenient.

Optionally, the first input includes a third sub-input and a fourth sub-input.

In a possible implementation, step 202 of the conversation creating method provided in the embodiments of this disclosure may be executed as step 202a and step 202b:

Step 202a. The terminal device displays, in response to a received third sub-input which is performed by the user, a first control.

Specifically, the terminal device displays, in response to the received third sub-input which is performed by the user, the first control in the first interface.

Figure 11:
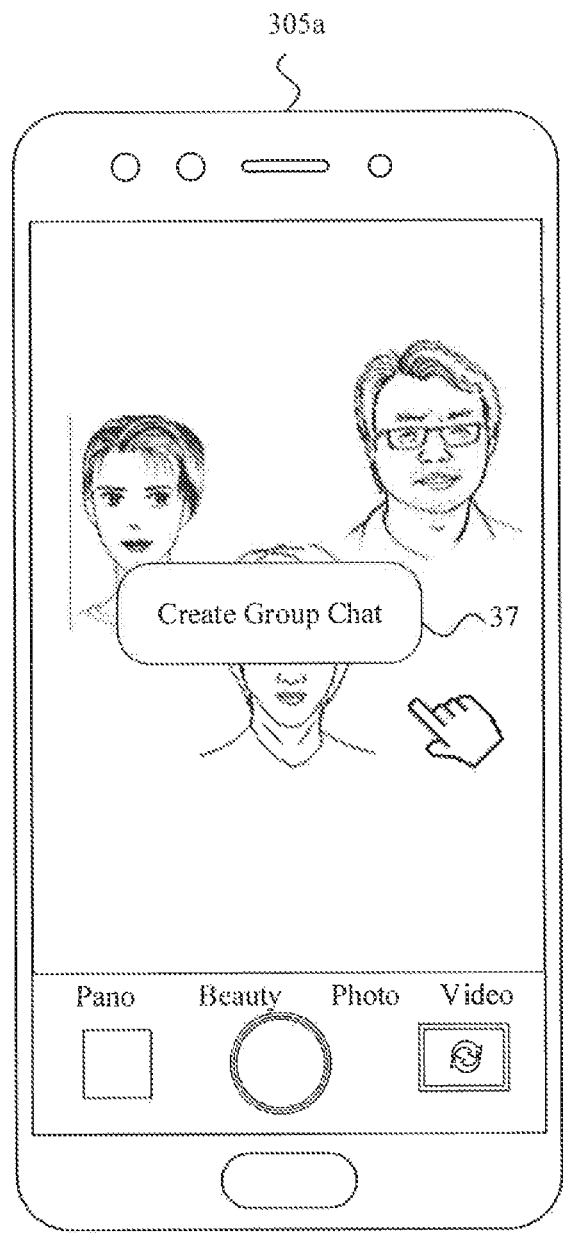
FIG. 11 is a ninth schematic diagram of a display interface according to an embodiment of this disclosure.

For example, the third sub-input may be an input of tapping the screen which is performed by the user, or an input of swiping the screen which is performed by the user. Specifically, the third sub-input may be a screen-tap input in an interface 305a shown in FIG. 11, and the first control may be a control 37 in the interface 305a, where the control 37 may display the text "Create Group Chat", or display "Create Conversation". Certainly, the third sub-input may also be a swipe input in two opposite directions as shown in an interface 306a in FIG. 12. The first control may alternatively be a control 38 in the interface 306a, which is a circular control with the word "Join Group Chat" displayed in the control 38. Certainly, the control 38 may alternatively be of other shapes with other text displayed, which is not specifically limited in the embodiments of this disclosure.

Step 202b. The terminal device updates, in response to a received fourth sub-input which is performed on the first control by the user, an interface displaying the first image to display an interface that includes an icon of at least one communication program.

Specifically, the terminal device updates, in response to the received fourth sub-input which is performed on an add control by the user, the first interface to display the second interface.

Figure 12:
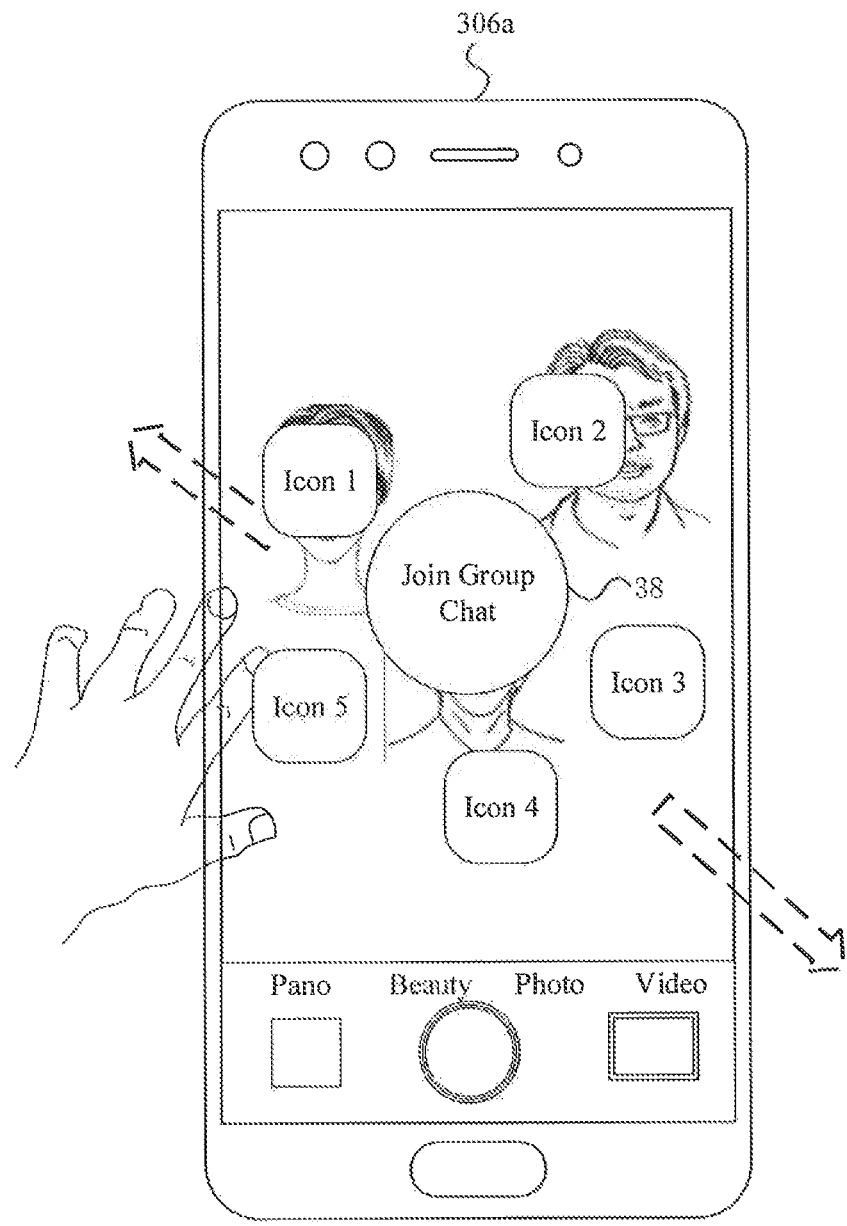
FIG. 12 is a tenth schematic diagram of a display interface according to an embodiment of this disclosure.
Figure 13:
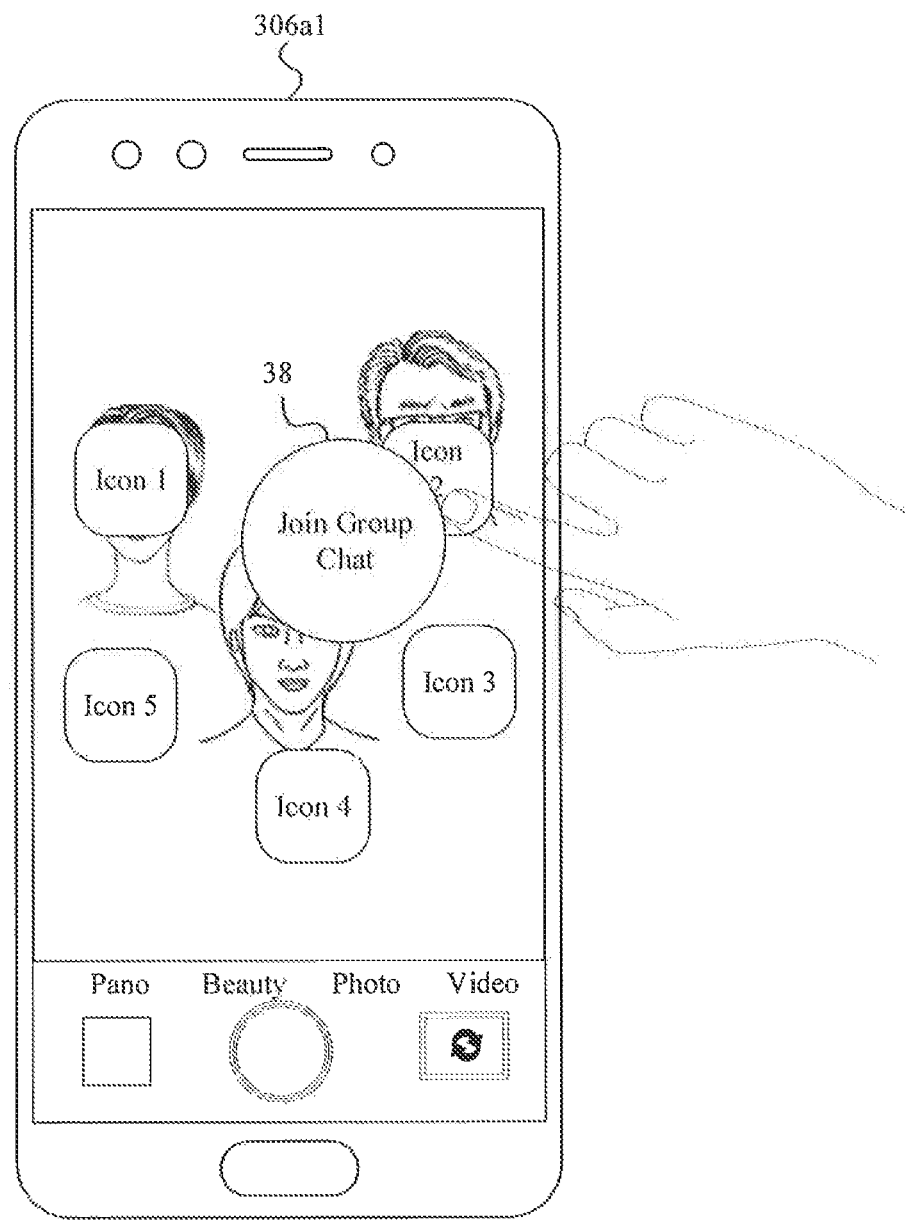
FIG. 13 is an eleventh schematic diagram of a display interface according to an embodiment of this disclosure.

For example, the second interface may also be the interface 306a shown in FIG. 12. The user may choose to move the first control to an icon in the interface 306a, as shown in an interface 306a1 in FIG. 13, thereby creating a conversation in a communication program corresponding to the icon.

It should be noted that when the first input is the input shown in FIG. 12, the terminal device may also display icons of multiple communication programs in addition to the first control displayed.

Based on this solution, the terminal device can display the first control on a display interface, thus allowing the user to operate the first control to select the information to be obtained.

In a possible implementation, step 205 of the conversation creating method provided in the embodiments of this disclosure may be specifically executed as step 205a:

Step 205a. The terminal device displays, in response to the second input, the N face images, the N target identifiers, and at least one candidate conversation identifier, where each conversation identifier is used to indicate one created conversation.

Specifically, the foregoing third interface further includes at least one candidate conversation identifier.

Further, step 206 may be performed as step 206a.

Step 206a. The terminal device receives the third input which is performed on a first conversation identifier by the user.

Further, step 204a may be performed as step 204a1.

Step 204a1. The terminal device displays, in response to the third input, a conversation interface including all target identifiers in the first conversation identifier and the N target identifiers.

The first conversation identifier is one of the at least one candidate conversation identifier.

Optionally, the third input may alternatively be an input which is performed on the first conversation identifier and a first target identifier by the user. The first conversation identifier is an identifier in the at least one candidate conversation identifier, the first target identifier is an identifier in the N target identifiers, the M target identifiers include an identifier indicating a user corresponding to a first conversation and the first target identifier, and the first conversation is a conversation indicated by the first conversation identifier.

Figure 14:
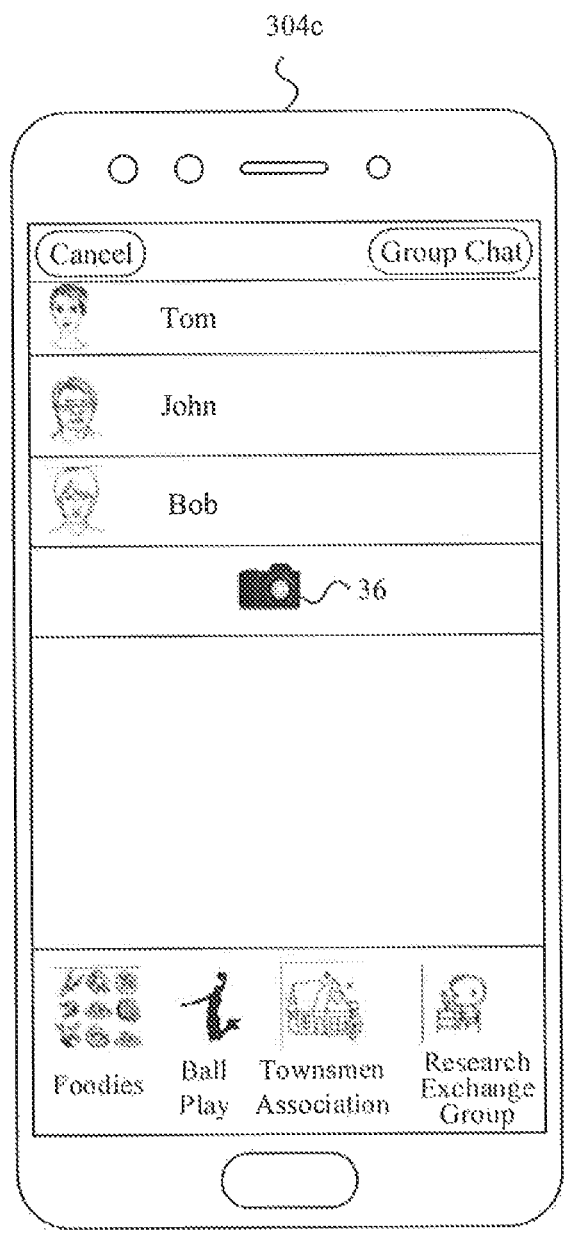
FIG. 14 is a twelfth schematic diagram of a display interface according to an embodiment of this disclosure.

For example, the conversation identifier may be a name of the conversation, for example, a name of a group chat. As shown in an interface 304c in FIG. 14, at least one conversation identifier can be displayed in the third interface, and the user can select an icon of one conversation and a name of a contact (that is, the first target identifier) to add the contact to the conversation. Certainly, the user may alternatively tap a conversation identifier to add all users in the third interface to the conversation. This is not specifically limited in the embodiments of this disclosure.

Based on this solution, the terminal device displays at least one candidate conversation identifier in the third interface, allowing the user to add a contact determined based on an image to at least one of the conversations, thus making the way to join an existing conversation easier and faster.

In a possible implementation, the conversation creating method provided by the embodiments of this disclosure may include step 212 after step 203.

Step 212. The terminal device displays N indication identifiers corresponding to the N face images.

One indication identifier is used to indicate similarity between one face image and a third image, and the third image is an image, in at least one target image, whose similarity with the one face image is greater than or equal to a similarity threshold, the at least one target image is an image corresponding to a second target identifier in the target communication program, and the second target identifier is a target identifier corresponding to the one face image.

Optionally, the third interface further includes the N indication identifiers corresponding to the N face images.

Optionally, the N indication identifiers may be numerical identifiers, text identifiers, or color identifiers, which are not specifically limited in the embodiments of this disclosure.

Figure 15:
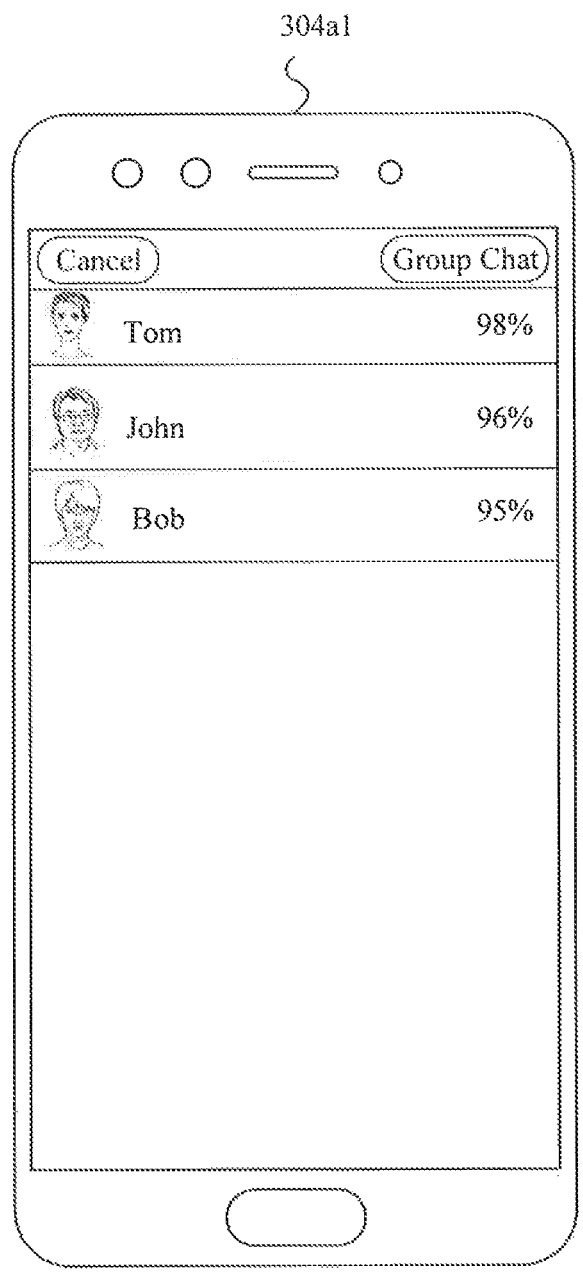
FIG. 15 is a thirteenth schematic diagram of a display interface according to an embodiment of this disclosure.

For example, the indication identifiers being numerical identifiers are used as an example. These identifiers are arranged in the interface 304a1 in FIG. 15 from top down in descending order of similarity. A face image in user information of Tom has the highest similarity to the corresponding face image in the first image at a row in which Tom is located, followed by John and Bob.

Specifically, in a case that a first target similarity is greater than or equal to a first threshold, the terminal device determines a contact corresponding to the first target similarity as a contact corresponding to the first face image; and in a case that the first target similarity is less than the first threshold and a second target similarity is greater than or equal to the first threshold, the terminal device determines a contact corresponding to the second target similarity as the contact corresponding to the first face image, where the first target similarity is similarity between a first face image and a second face image, the second face image is a face image on a profile photo in the contact list or a face image in a contact tag, and the first face image is any one of at least one face image in the first image; and the second target similarity is similarity between the first face image and a third face image, the third face image is a face image that is not in the contact list and is on a profile photo in a second conversation containing the user, and the second conversation is a conversation in a target communication program.

Figure 16:
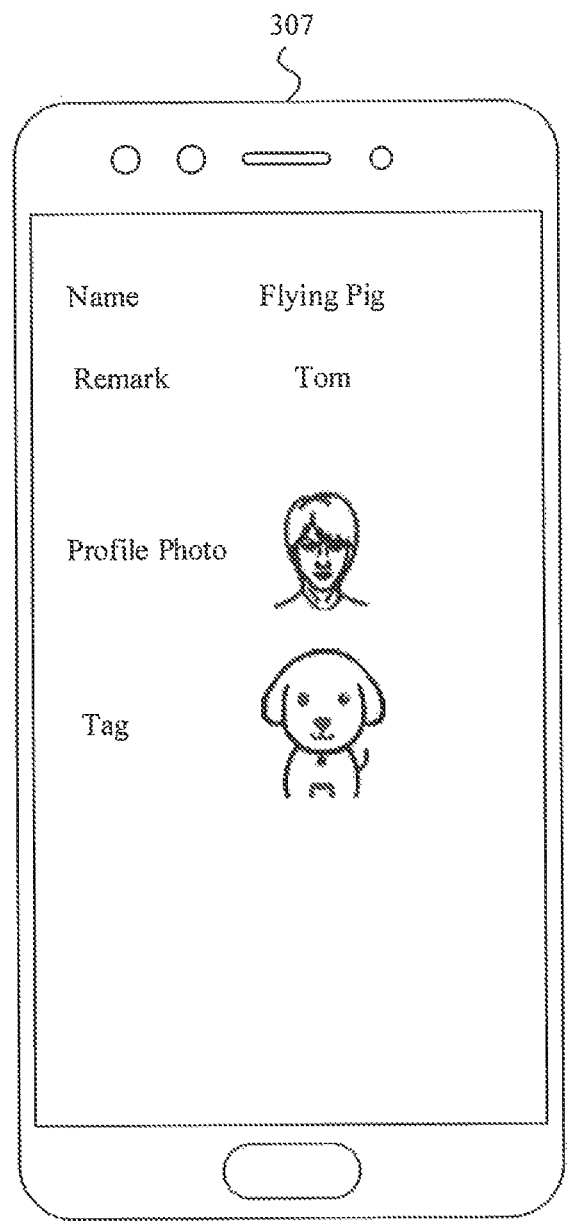
FIG. 16 is a fourteenth schematic diagram of a display interface according to an embodiment of this disclosure.

It should be noted that the terminal device can select user information in a communication program when calculating the similarity. The user information may include a profile photo and a tag. The profile photo may be a face image that the user notes for another user on the terminal device. For example, the profile photo, as shown in an interface 307 in FIG. 16, is a face image noted by the user for user Flying Pig. Alternatively, the profile photo may be an image that another user sets for himself. An image in the tag may also be a face image noted by the user on his own terminal device for another user, or an image that another user sets for himself. For example, the tag in FIG. 16 is an image of a puppy set by the user Flying Pig for himself. This is not specifically limited in the embodiments of this disclosure.

It can be understood that any one of the foregoing third interfaces, for example the interface 304b4, the interface 304c, or the like, can display indication identifiers by which the user can determine face images in the user information of which users have higher similarity with a face image in the first image, so that the user can have a reference for selecting contacts whom the user wants to create a conversation with and send information to.

Based on this solution, the terminal device can display similarity of each contact to the face image corresponding to each contact in the third interface, allowing the user to obtain more accurate information, so that the user can have a reference for selecting contacts whom the user wants to create a conversation with to send information to.

Figure 17:
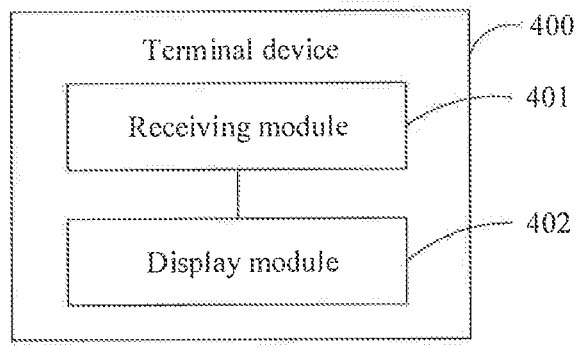
FIG. 17 is a possible schematic structural diagram of a terminal device according to an embodiment of this disclosure.

FIG. 17 is a possible schematic structural diagram of a terminal device according to an embodiment of this disclosure. As shown in FIG. 17, the terminal device 400 includes a receiving module 401 and a display module 402. The receiving module 401 is configured to receive a first input which is performed on a first image that includes at least one face image by a user; the display module 402 is configured to display, in response to the first input received by the receiving module 401, an icon of at least one communication program; the receiving module 401 is further configured to receive a second input which is performed by the user; and the display module 402 is further configured to display, in response to the second input received by the receiving module 401, a conversation interface that includes M target identifiers, where each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M.

Optionally, the display module 402 is specifically configured to display, in response to the first input received by the receiving module 401, the at least one face image in the first image and the icon of the at least one communication program.

Optionally, the display module 402 is further configured to display, in response to the second input after the receiving module 401 receives the second input which is performed by the user, N face images and N target identifiers, where each of the face images corresponds to one target identifier, N users indicated by the N target identifiers include users indicated by P face images in the at least one face image, the N target identifiers are identifiers in the target communication program, and P is an integer less than or equal to N; the receiving module 401 is further configured to receive the third input which is performed by the user; and the display module 402 is specifically configured to, in response to the third input received by the receiving module 401, display the conversation interface.

Optionally, the third input is a swipe input which is performed in a preset direction in a blank region without the N face images and the N target identifiers displayed by the user.

Optionally, the display module 402 is further configured to display, after the receiving module 401 receives the second input, a preset control; the receiving module 401 is further configured to receive a fourth input which is performed on the preset control by the user; and the display module 402 is configured to display, in response to the fourth input received by the receiving module 401, T face images and T target identifiers, where the T face images include the N face images, the T target identifiers include the N target identifiers, other face images in the T face images than the N face images are face images in a second image, the second image is an image corresponding to the fourth input, users indicated by other target identifiers in the T target identifiers than the N target identifiers are users indicated by the other face images, and T is a positive integer.

Optionally, the fourth input includes a first sub-input and a second sub-input; and the display module 402 is specifically configured to, in a case that the N face images and the N target identifiers are displayed in a first region, display, in response to the first sub-input which is performed on the preset control by the user, a shooting preview interface in a second region; and in response to the second sub-input which is performed on the preset control by the user, perform a shooting operation, display in the second region the second image that is shot, and display in the first region a first face image in the second image, a first target identifier, the N face images, and the N target identifiers.

Optionally, the receiving module 401 is further configured to, after the N face images and the N target identifiers are displayed by the display module 402, receive a fifth input which is performed by the user; and the display module 402 is further configured to display, in response to the fifth input received by the receiving module 401, J face images and J target identifiers, where the J face images are images in the N face images, the J target identifiers are identifiers in the N target identifiers, and J is a positive integer less than N.

Optionally, the receiving module 401 is further configured to, after the N face images and the N target identifiers are displayed in the display module 402, receive a fifth input which is performed on a second face image by the user; and the display module 402 is further configured to delete, in response to the fifth input received by the receiving module 401, the second face image and at least one target identifier corresponding to the second face image.

Optionally, the first input includes a first sub-input and a second sub-input; and the display module 402 is specifically configured to display, in response to the first sub-input which is performed by the user received by the receiving module 401, an add control; and display, in response to the second sub-input which is performed on the add control by the user received by receiving module 401, the icon of the at least one communication program.

Optionally, the display module 402 is specifically configured to display, in response to the second input, the N face images, the N target identifiers, and at least one candidate conversation identifier, where each conversation identifier is used to indicate one created conversation; the receiving module 401 is specifically configured to receive a third input which is performed on a first conversation identifier by the user; and the display module 402 is specifically configured to display, in response to the third input received by the receiving module 401, a conversation interface including all target identifiers in the first conversation identifier and the N target identifiers, where the first conversation identifier is one of the at least one candidate conversation identifier.

Optionally, the display module 402 is further configured to display, after the receiving module 401 receives the second input which is performed by the user, N indication identifiers corresponding to the N face images, where one indication identifier is used to indicate similarity between one face image and a third image, and the third image is an image, in at least one target image, whose similarity with the one face image is greater than or equal to a similarity threshold, the at least one target image is an image corresponding to a second target identifier in the target communication program, and the second target identifier is a target identifier corresponding to the one face image.

The terminal device 400 provided by the embodiments of this disclosure can implement the processes implemented by the terminal device in the foregoing method embodiment. To avoid repetition, details are not described herein again.

According to the terminal device provided by the embodiments of this disclosure, firstly, the terminal device receives a first input which is performed on a first image that includes at least one face image by a user. Secondly, the terminal device displays, in response to the first input, an icon of at least one communication program. Then, the terminal device receives a second input which is performed by the user. Finally, the terminal device displays, in response to the second input, a conversation interface that includes M target identifiers. Each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M. The first image includes a face image, and the terminal device can display the icon of the at least one communication program to the user based on the received first input which is performed on the first image by the user, thereby allowing the user to select a communication program and to select face images corresponding to desired users. After the user finishes selection, the terminal device displays a conversation interface for users indicated by K face images in the at least one face image. Therefore, the conversation creating method provided in the embodiments of this disclosure can quickly find a desired contact based on an image that includes a face image, and then can quickly create a conversation or add the user to an existing group chat.

Figure 18:
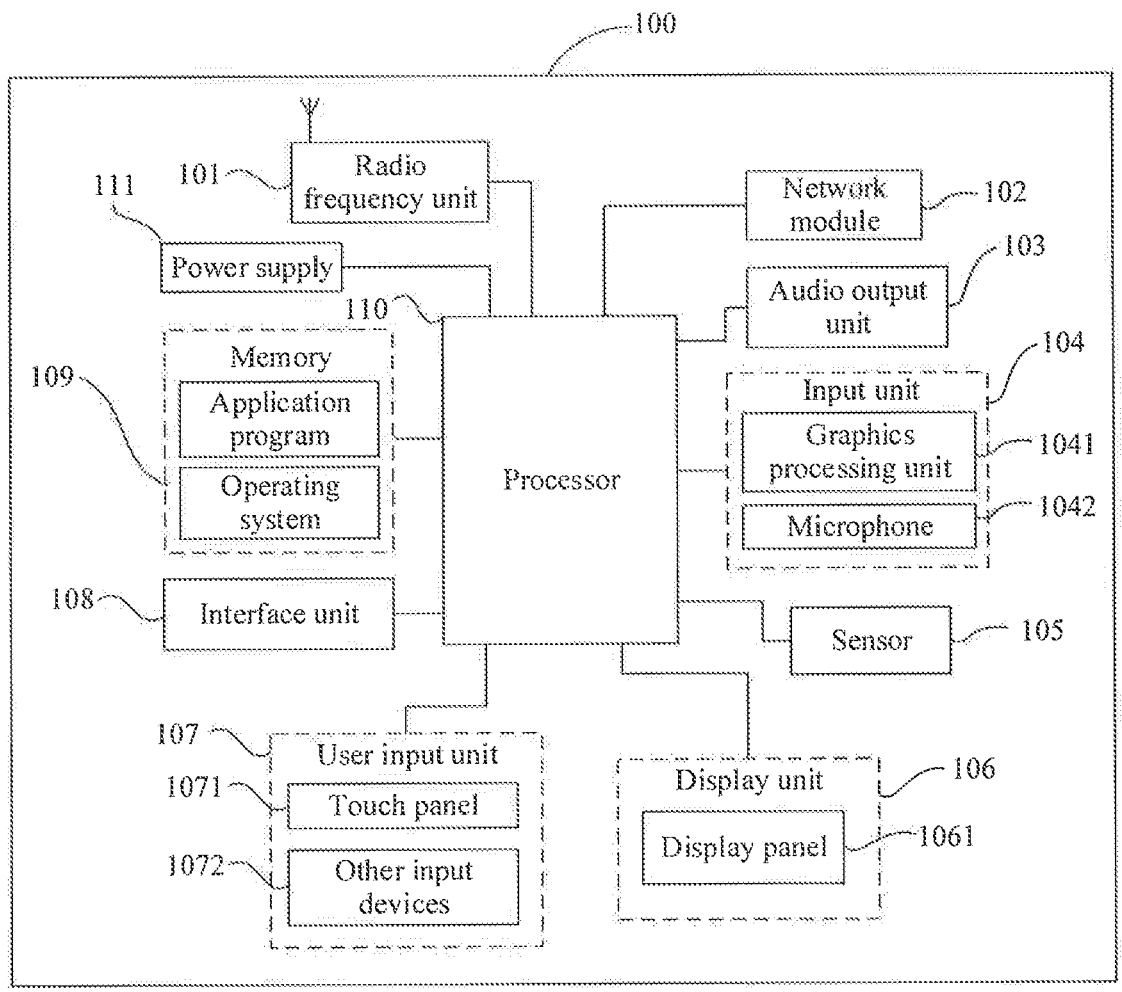
FIG. 18 is a schematic diagram of a hardware structure of a terminal device according to the embodiments of this disclosure.

FIG. 18 is a schematic diagram of a hardware structure of a terminal device for implementing the embodiments of this disclosure. The terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the terminal device is not limited to the terminal device structure shown in FIG. 18. The terminal device may include more or fewer components than those shown in the figure, or combine some of the components, or arrange the components differently. In the embodiments of this disclosure, the terminal device includes but is not limited to a mobile phone, a tablet computer, a laptop computer, a palmtop computer, an in-vehicle terminal device, a wearable device, a pedometer, and the like.

The user input unit 107 is configured to receive a first input which is performed on a first image that includes at least one face image by a user; the display unit 106 is configured to display, in response to the first input, an icon of at least one communication program; the user input unit 107 is further configured to receive a second input which is performed by the user; and the display unit 106 is further configured to display, in response to the second input, a conversation interface that includes M target identifiers, where each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M.

According to the terminal device provided by the embodiments of this disclosure, firstly, the terminal device receives a first input which is performed on a first image that includes at least one face image by a user. Secondly, the terminal device displays, in response to the first input, an icon of at least one communication program. Then, the terminal device receives a second input which is performed by the user. Finally, the terminal device displays, in response to the second input, a conversation interface that includes M target identifiers. Each of the target identifiers is used to indicate one user, M users indicated by the M target identifiers include users indicated by K face images in the at least one face image, and the M target identifiers are identifiers in a target communication program corresponding to the second input, where M and K are both positive integers, and K is less than or equal to M. The first image includes a face image, and the terminal device can display the icon of the at least one communication program to the user based on the received first input which is performed on the first image by the user, thereby allowing the user to select a communication program and to select face images corresponding to desired users. After the user finishes selection, the terminal device displays a conversation interface for users indicated by K face images in the at least one face image. Therefore, the conversation creating method provided in the embodiments of this disclosure can quickly find a desired contact based on an image that includes a face image, and then can quickly create a conversation or add the user to an existing group chat.

It should be understood that, in an embodiment of this disclosure, the radio frequency unit 101 may be configured to transmit or receive a signal in an information transmitting/receiving or call process. Specifically, the radio frequency unit 101 receives downlink data from a base station and transmits the downlink data to the processor 110 for processing; and transmits uplink data to the base station. Typically, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices via a wireless communications system.

The terminal device provides the user with wireless broadband Internet access by using the network module 102, for example, helping the user send or receive an email, browse a web page, and access streaming media.

The audio output unit 103 may convert audio data received by the radio frequency unit 101 or the network module 102 or stored in the memory 109 into an audio signal, and output the audio signal as a sound. In addition, the audio output unit 103 may further provide audio output (for example, a call signal received sound or a message received sound) related to a specific function performed by the terminal device 100. The audio output unit 103 includes a loudspeaker, a buzzer, a phone receiver, and the like.

The input unit 104 is configured to receive an audio signal or a video signal. The input unit 104 may include a graphics processing unit (GPU) 1041 and a microphone 1042. The graphics processing unit 1041 processes image data of a still picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or another storage medium), or may be sent by the radio frequency unit 101 or the network module 102. The microphone 1042 may receive a sound, and can process the sound into audio data. In a phone call mode, processed audio data may be converted into a format transmittable by the radio frequency unit 101 to a mobile communications base station, and output as such.

The terminal device 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the terminal device 100 moves near an ear, the proximity sensor may disable the display panel 1061 and/or backlight. As a motion sensor, an accelerometer sensor may detect the magnitudes of accelerations in various directions (usually three axes), may detect the magnitude and direction of gravity when the terminal is static, and may be configured to recognize a posture of the terminal device (for example, for landscape/portrait mode switching, related gaming, or magnetometer posture calibration), provide a function related to vibration recognition (for example, pedometer or tapping), or the like. The sensor 105 may further include a fingerprint sensor, a pressure sensor, an iris sensor, a molecular sensor, a gyroscope, a barometer, a hygrometer, a thermometer, or an infrared sensor. Details are not further described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information, and generate key signal input that is related to user setting and function control of the terminal device. Specifically, the user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch orientation by the user, detects a signal brought by the touch operation, and transmits the signal to the touch controller. The touch controller receives touch information from the touch detection apparatus, converts the touch information into touch point coordinates, transmits the touch point coordinates to the processor 110, and receives and executes a command transmitted by the processor 110. In addition, the touch panel 1071 may be implemented in a plurality of forms, for example, as a resistive, capacitive, infrared, or surface acoustic wave touch panel. In addition to the touch panel 1071, the user input unit 107 may further include the other input devices 1072. Specifically, the other input devices 1072 may include but are not limited to a physical keyboard, a function key (for example, a volume control key or a power on/off key), a track ball, a mouse, and a joystick. Details are not described herein.

Further, the touch panel 1071 may cover the display panel 1061. After detecting a touch operation on or near the touch panel 1071, the touch panel 1071 transmits the touch operation to the processor 110 for the processor 110 to determine a type of a touch event. Then the processor 110 provides corresponding visual output on the display panel 1061 based on the type of the touch event. In FIG. 18, the touch panel 1071 and the display panel 1061 serve as two separate components to implement input and output functions of the terminal device. However, in some embodiments, the touch panel 1071 and the display panel 1061 may be integrated to implement the input and output functions of the terminal device. This is not specifically limited herein.

The interface unit 108 is an interface for connecting an external apparatus to the terminal device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 108 may be configured to receive an input (for example, data information or power) from an external apparatus and transmit the received input to one or more elements within the terminal 100, or may be configured to transmit data between the terminal device 100 and the external apparatus.

The memory 109 may be configured to store software programs and various types of data. The memory 109 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 109 may include a high-speed random access memory, and may further include a nonvolatile memory, for example, at least one magnetic disk storage device or a flash memory device, or another volatile solid-state storage device.

The processor 110 is a control center of the terminal device, uses various interfaces and lines to connect all parts of the entire terminal device, and performs various functions and data processing of the terminal device by running or executing the software program and/or module stored in the memory 109 and invoking data stored in the memory 109, thereby performing overall monitoring on the terminal device. The processor 110 may include one or more processing units. Optionally, the processor 110 may integrate an application processor and a modem processor. The application processor mainly processes an operating system, a user interface, an application program, and the like. The modem processor mainly processes wireless communication. It may be understood that the modem processor may alternatively not be integrated into the processor 110.

The terminal device 100 may further include a power supply 111 (for example, a battery) that supplies power to the components. Optionally, the power supply 111 may be logically connected to the processor 110 by using a power management system, so as to implement functions such as charging management, discharging management, and power consumption management by using the power management system.

In addition, the terminal device 100 includes some functional modules that are not illustrated. Details are not described herein.

Optionally, referring to FIG. 18, an embodiment of this disclosure further provides a terminal device, including: a processor 110, a memory 109, and a computer program that is stored in the memory 109 and capable of running on the processor 110. When the computer program is executed by the processor 110, the processes of the foregoing embodiments of the conversation creating method are implemented, with the same technical effects achieved. To avoid repetition, details are not described herein again.

An embodiment of this disclosure further provides a computer-readable storage medium, where the computer-readable storage medium stores a computer program, and when the computer program is executed by a processor, each process of the foregoing embodiments of the conversation creating method is implemented, and a same technical effect can be achieved. Therefore, details are not described herein again to avoid repetition. For example, the computer-readable storage medium is a read-only memory (ROM), a random access memory (RAM), a magnetic disk, or an optical disc.

It should be noted that the terms "comprise", "include", and any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing one terminal device (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A conversation creating method, wherein the method comprises:
   receiving a first input which is performed on a first image that comprises at least one face image by a user;
   displaying, in response to the first input, an icon of at least one communication program;
   receiving a second input which is performed by the user, the second input comprises an input for selecting a target communication program from the at least one communication program;
   displaying, in response to the second input, N face images and N target identifiers, wherein each of the face images corresponds to one target identifier, N users indicated by the N target identifiers comprise users indicated by P face images in the at least one face image, and the N target identifiers are identifiers in the target communication program, wherein P is an integer less than or equal to N;
   receiving a third input which is performed by the user; and
   displaying, in response to the third input, a conversation interface that comprises M target identifiers, wherein each of the target identifiers is used to indicate one user, M users indicated by the M target identifiers comprise users indicated by K face images in the at least one face image, and the M target identifiers are identifiers in the target communication program corresponding to the second input, wherein M and K are both positive integers, and K is less than or equal to M;

wherein after the receiving a second input which is performed by the user, the method further comprises:

displaying N indication identifiers corresponding to the N face images, wherein one indication identifier is used to indicate similarity between one face image and a third image, and the third image is an image, in at least one target image, whose similarity with the one face image is greater than or equal to a similarity threshold, the at least one target image is an image corresponding to a second target identifier in the target communication program, and the second target identifier is a target identifier corresponding to the one face image.

2. The method according to claim 1, wherein the displaying, in response to the first input, an icon of at least one communication program, comprises:

displaying, in response to the first input, the at least one face image in the first image and the icon of the at least one communication program.

3. The method according to claim 1, wherein the third input is a swipe input which is performed in a preset direction in a blank region without the N face images and the N target identifiers displayed by the user.

4. The method according to claim 1, wherein after the receiving a second input, the method further comprises:

displaying a preset control;

receiving a fourth input which is performed on the preset control by the user; and displaying, in response to the fourth input, T face images and T target identifiers, wherein the T face images comprise the N face images, the T target identifiers comprise the N target identifiers, other face images in the T face images than the N face images are face images in a second image, the second image is an image corresponding to the fourth input, users indicated by other target identifiers in the T target identifiers than the N target identifiers are users indicated by the other face images, and T is a positive integer.

5. The method according to claim 4, wherein the fourth input comprises a first sub-input and a second sub-input; and the displaying, in response to the fourth input, T face images and T target identifiers comprises:

in a case that the N face images and the N target identifiers are displayed in a first region, displaying, in response to the first sub-input which is performed on the preset control by the user, a shooting preview interface, in a second region; and in response to the second sub-input which is performed on the preset control by the user, performing a shooting operation, displaying in the second region the second image that is shot, and displaying in the first region a first face image in the second image, a first target identifier, the N face images, and the N target identifiers.

6. The method according to claim 1, wherein after the displaying, in response to the second input, N face images and N target identifiers, the method further comprises:

receiving a fifth input which is performed on a second face image by the user; and deleting, in response to the fifth input, the second face image and at least one target identifier corresponding to the second face image.

7. The method according to claim 1, wherein the displaying, in response to the second input, N face images and N target identifiers comprises:

displaying, in response to the second input, the N face images, the N target identifiers, and at least one candidate conversation identifier, wherein each conversation identifier is used to indicate one created conversation;

the receiving a third input comprises:

receiving the third input which is performed on a first conversation identifier by the user; and the displaying, in response to the third input, the conversation interface comprises:

displaying, in response to the third input, a conversation interface comprising all target identifiers in the first conversation identifier and the N target identifiers, wherein the first conversation identifier is one of the at least one candidate conversation identifier.

8. A terminal device, comprising:

a processor, a memory, and a computer program stored in the memory and capable of running on the processor, wherein when the computer program is executed by the processor, the following steps are implemented:

receiving a first input which is performed on a first image that comprises at least one face image by a user;

displaying, in response to the first input, an icon of at least one communication program;

receiving a second input which is performed by the user, the second input comprises an input for selecting a target communication program from the at least one communication program;

displaying, in response to the second input, N face images and N target identifiers, wherein each of the face images corresponds to one target identifier, N users indicated by the N target identifiers comprise users indicated by P face images in the at least one face image, and the N target identifiers are identifiers in the target communication program, wherein P is an integer less than or equal to N;

receiving a third input which is performed by the user; and displaying, in response to the third input, a conversation interface that comprises M target identifiers, wherein each of the target identifiers is used to indicate one user, M users indicated by the M target identifiers comprise users indicated by K face images in the at least one face image, and the M target identifiers are identifiers in the target communication program corresponding to the second input, wherein M and K are both positive integers, and K is less than or equal to M;

wherein when the computer program is executed by the processor, after the receiving a second input which is performed by the user, the following steps are further implemented:

displaying N indication identifiers corresponding to the N face images, wherein one indication identifier is used to indicate similarity between one face image and a third image, and the third image is an image, in at least one target image, whose similarity with the one face image is greater than or equal to a similarity threshold, the at least one target image is an image corresponding to a second target identifier in the target communication program, and the second target identifier is a target identifier corresponding to the one face image.

9. The terminal device according to claim 8, wherein the displaying, in response to the first input, an icon of at least one communication program, comprises:

displaying, in response to the first input, the at least one face image in the first image and the icon of the at least one communication program.

10. The terminal device according to claim 8, wherein the third input is a swipe input which is performed in a preset direction in a blank region without the N face images and the N target identifiers displayed by the user.

11. The terminal device according to claim 8, wherein when the computer program is executed by the processor, after the receiving a second input, the following steps are further implemented:
displaying a preset control;
receiving a fourth input which is performed on the preset control by the user; and
displaying, in response to the fourth input, T face images and T target identifiers, wherein
the T face images comprise the N face images, the T target identifiers comprise the N target identifiers, other face images in the T face images than the N face images are face images in a second image, the second image is an image corresponding to the fourth input, users indicated by other target identifiers in the T target identifiers than the N target identifiers are users indicated by the other face images, and T is a positive integer.

12. The terminal device according to claim 11, wherein the fourth input comprises a first sub-input and a second sub-input; and the displaying, in response to the fourth input, T face images and target identifiers comprises:
in a case that the N face images and the N target identifiers are displayed in a first region, displaying, in response to the first sub-input which is performed on the preset control by the user, a shooting preview interface in a second region; and
in response to the second sub-input which is performed on the preset control by the user, performing a shooting operation, displaying in the second region the second image that is shot, and displaying in the first region a first face image in the second image, a first target identifier, the N face images, and the N target identifiers.

13. The terminal device according to claim 8, wherein when the computer program is executed by the processor, after the displaying, in response to the second input, N face images and N target identifiers, the following steps are further implemented:
receiving a fifth input which is performed on a second face image by the user; and
deleting, in response to the fifth input, the second face image and at least one target identifier corresponding to the second face image.

14. The terminal device according to claim 8, wherein the displaying, in response to the second input, N face images and N target identifiers comprises:
displaying, in response to the second input, the N face images, the N target identifiers, and at least one candidate conversation identifier, wherein each conversation identifier is used to indicate one created conversation;
the receiving a third input comprises:
receiving the third input which is performed on a first conversation identifier by the user; and
the displaying, in response to the third input, the conversation interface comprises:
displaying, in response to the third input, a conversation interface comprising all target identifiers in the first conversation identifier and the N target identifiers, wherein
the first conversation identifier is one of the at least one candidate conversation identifier.

15. A non-transitory computer readable storage medium, wherein the computer readable storage medium stores a computer program, and when the computer program is executed by a processor, the steps of the conversation creating method according to claim 1 are implemented.

16. A conversation creating method, wherein the method comprises;
receiving a first input which is performed on a first image that comprises at least one face image by a user;
displaying, in response to the first input, an icon of at least one communication program;
receiving a second input which is performed by the user, the second input comprises an input for selecting a target communication program from the at least one communication program;
displaying, in response to the second input, N face images and N target identifiers, wherein each of the face images corresponds to one target identifier, N users indicated by the N target identifiers comprise users indicated by P face images in the at least one face image, and the N target identifiers are identifiers in the target communication program, wherein P is an integer less than or equal to N;
receiving a third input which is performed by the user; and
displaying, in response to the third input, a conversation interface that comprises M target identifiers, wherein
each of the target identifiers is used to indicate one user, M users indicated by the target identifiers comprise users indicated by K face images in the at least one face image, and the M target identifiers are identifiers in the target communication program corresponding to the second input, wherein M and K are both positive integers, and K is less than or equal to M;
wherein after the receiving a second input, the method further comprises:
displaying a preset control;
receiving a fourth input which is performed on the preset control by the user; and
displaying, in response to the fourth input, T face images and target identifiers, wherein
the T face images comprise the N face images, the T target identifiers comprise the N target identifiers, other face images in the T face images than the N face images are face images in a second image, the second image is an image corresponding, to the fourth input, users indicated by other target identifiers in the T target identifiers than the N target identifiers are users indicated by the other face images, and T is a positive integer;
wherein the fourth input comprises a first sub-input and a second sub-input; and the displaying, in response to the fourth input, T face images and T target identifiers comprises:
in a case that the N face images and the N target identifiers are displayed in a first region, displaying, in response to the first sub-input which is performed on the preset control by the user, a shooting preview interface in a second region; and
in response to the second sub-input which is performed on the preset control by the user, performing a shooting operation, displaying in the second region the second image that is shot, and displaying in the first region a first face image in the second image, a first target identifier, the N face images, and the N target identifiers.

17. The method according to claim 16, wherein after the receiving a second input which is performed by the user, the method further comprises:

displaying N indication identifiers corresponding to the N face images, wherein one indication identifier is used to indicate similarity between one face image and a third image, and the third image is an image, in at least one target image, whose similarity with the one face image is greater than or equal to a similarity threshold, the at least one target image is an image corresponding to a second target identifier in the target communication program, and the second target identifier is a target identifier corresponding to the one face image.

18. A terminal device, comprising a processor, a memory, and a computer program stored in the memory and capable of running on the processor, wherein when the computer program is executed by the processor, the steps of the conversation creating method according to claim 16 are implemented.

19. A non-transitory computer readable storage medium, wherein the computer readable storage medium stores a computer program, and when the computer program is executed by a processor, the steps of the conversation creating method according to claim 16 are implemented.

\* \* \* \* \*